(12) United States Patent
Hashimoto

(10) Patent No.: US 6,972,799 B1
(45) Date of Patent: Dec. 6, 2005

(54) AUTO FOCUSING APPARATUS SELECTIVELY OPERABLE IN AN ORDINARY MODE AND A HIGH SPEED MODE

(75) Inventor: Hitoshi Hashimoto, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/160,604

(22) Filed: Sep. 25, 1998

(30) Foreign Application Priority Data

Sep. 26, 1997 (JP) .................................. 9-262526

(51) Int. Cl.[7] ........................ H04N 5/232; G03B 13/00
(52) U.S. Cl. ..................................... 348/350; 348/345
(58) Field of Search ............................ 348/222.1, 345, 348/347, 349, 350, 351, 353–356, 362, 363, 348/364, 348, 352

(56) References Cited

U.S. PATENT DOCUMENTS

| | | | | |
|---|---|---|---|---|
| 5,196,939 A | * | 3/1993 | Elabd | 348/314 |
| 5,563,658 A | * | 10/1996 | Parulski | 348/353 |
| 5,629,735 A | * | 5/1997 | Kaneda | 348/350 |
| 5,668,597 A | * | 9/1997 | Parulski | 348/350 |
| 5,694,168 A | * | 12/1997 | Toji | 348/354 |
| 6,088,060 A | * | 7/2000 | Suda | 348/350 |
| 6,091,452 A | * | 7/2000 | Nishiyama | 348/349 |

* cited by examiner

Primary Examiner—Tuan Ho
Assistant Examiner—Justin Misleh
(74) Attorney, Agent, or Firm—Frishauf, Holtz, Goodman & Chick, P.C.

(57) ABSTRACT

A subject image is formed on a CCD through an imaging optical system including a focusing lens. The output from the CCD is input, through an A/D converter and the like, to an AE processor circuit for performing an auto-exposure control processing and an AF processor circuit for obtaining an evaluation value for auto-focusing through a gate circuit. When a release operation is performed, a CPU drives the focusing lens and operates the AF processor circuit and the like at a high speed frame rate if the CPU determines, on the basis of brightness evaluation values from the AE processor circuit, that the brightness of the subject is equal to or higher than predetermined brightness, and drives the focusing lens and operates the AF processor circuit and the like with high precision at an ordinary frame rate if the CPU determines that the brightness of the subject is lower than the predetermined brightness, thereby performing auto-focusing.

17 Claims, 16 Drawing Sheets

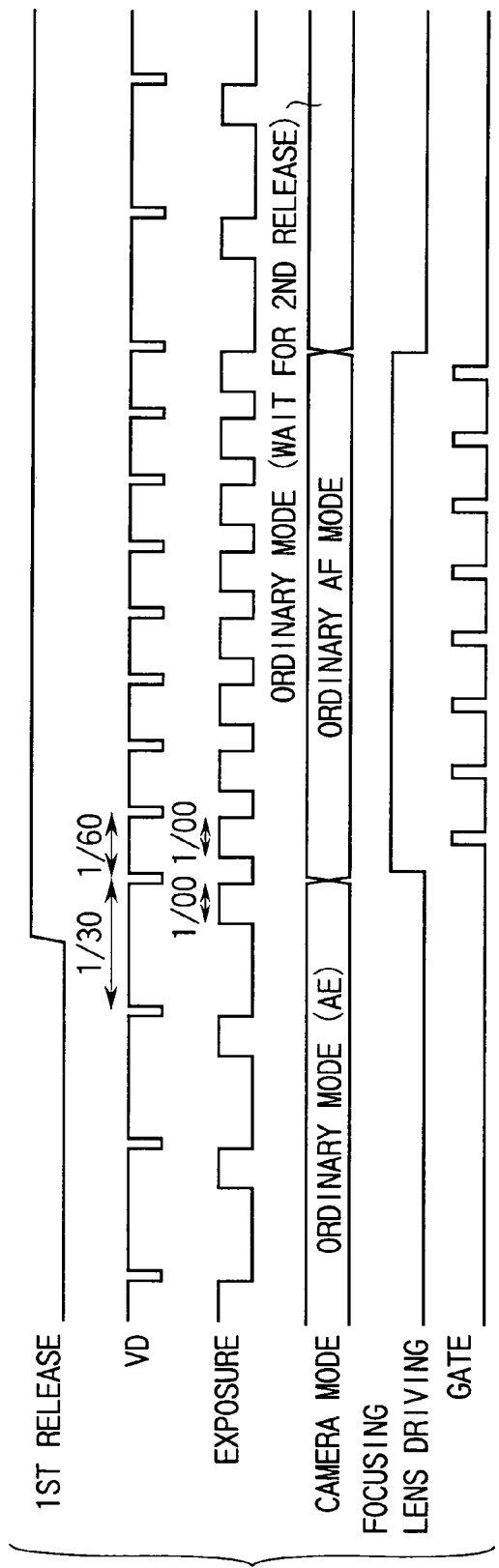
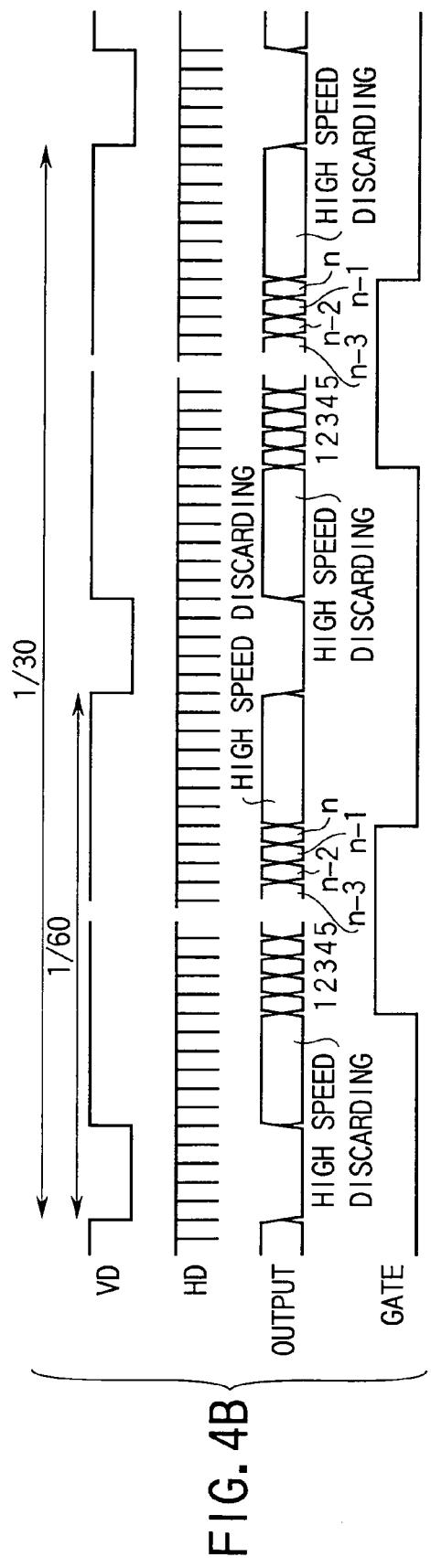
FIG. 4A
FIG. 4B

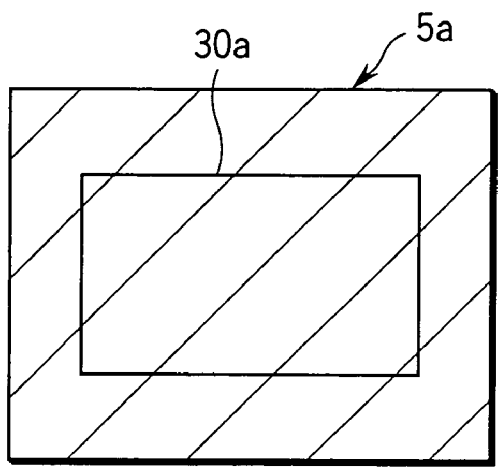
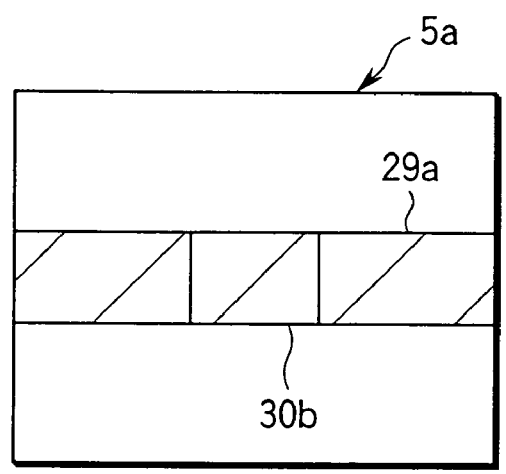
FIG. 9A  FIG. 9B
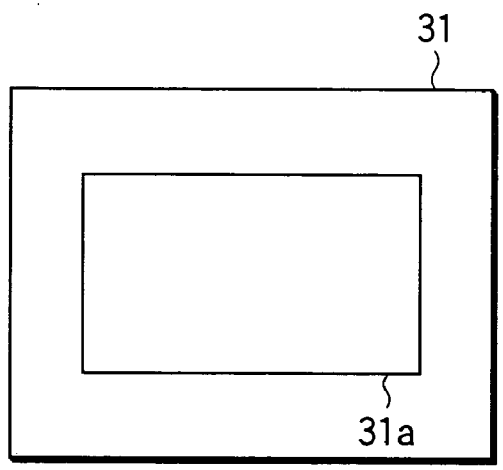
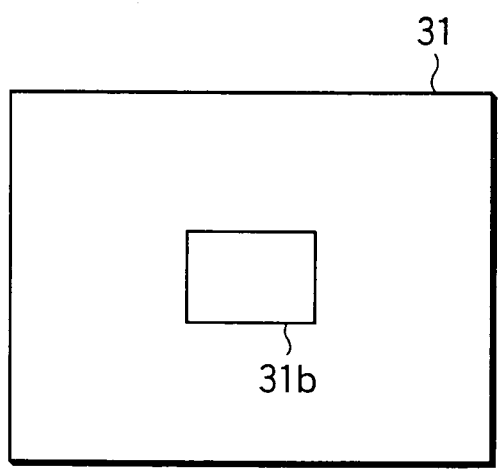
FIG. 11A  FIG. 11B

16 DIVIDED AREAS

IN ORDINARY AF MODE

IN HIGH SPEED AF MODE

AUTO FOCUSING APPARATUS SELECTIVELY OPERABLE IN AN ORDINARY MODE AND A HIGH SPEED MODE

BACKGROUND OF THE INVENTION

The present invention relates to an auto-focusing apparatus for automatically setting an imaging optical system in an in-focus state in an image pickup instrument for picking up an image using a solid state image sensor.

Recently, electronic image pickup instruments designed to pick up subject images by using imagers using solid state image sensors and record the images on recording media including magnetic tapes and semiconductor memories have been widely used.

Some auto-focusing apparatus for setting the imaging optical system in such an electronic image pickup instrument uses a method of extracting high frequency components from a picture signal representing the contour or structure of a subject image on the basis of, for example, an output from an imager, and driving the imaging optical system to the lens position corresponding to the peak value of the high frequency components.

Since conventional electronic image pickup instruments could not appropriately cope with different imaging conditions, demands have arisen for an auto-focusing apparatus that can cope with different imaging conditions more appropriately.

BRIEF SUMMARY OF THE INVENTION

It is an object of the present invention to provide an auto-focusing apparatus which can perform a proper auto-focusing in accordance with imaging conditions.

According to the present invention, there is provided an auto-focusing apparatus an image pickup unit which has an imaging plane on which a subject image is formed, and generates an image signal, and a focusing processor unit for selectively executing an ordinary mode of reading an image signal from an entire imaging plane of the image pickup unit and performing focusing at an ordinary frame rate and a high speed mode of reading an image signal from a predetermined portion of the imaging plane of the image pickup unit and performing focusing at a high speed frame rate.

According to the present invention, there is provided an auto-focusing apparatus in which an image pickup unit is operated at a high speed frame rate when a bright scene is to be imaged and a short exposure time is allowed, and is operated at an ordinary frame rate when a dark scene is to be imaged and a long exposure time is required, thereby realizing an optimal auto-focusing in accordance with the brightness.

According to the present invention, there is provided an auto-focusing apparatus in which an image pickup unit is operated at a high speed frame rate when a battery remaining quantity is large, and is operated at an ordinary frame rate when the battery remaining quantity is small, thereby performing an optimal auto-focusing in accordance with the battery remaining quantity.

According to the present invention, there is provided an auto-focusing apparatus in which a first auto-focusing is performed by operating an image pickup unit at a high speed frame rate, and a second auto-focusing is performed by operating the image pickup unit at an ordinary frame rate when an in-focus state cannot be obtained by the first auto-focusing, thereby reliably bringing a subject with a low brightness or a low contrast into focus and increasing an auto-focusing hit rate.

According to the present invention, there is provided an auto-focusing apparatus in which a narrow auto-focusing detection area is set while an image pickup unit operates at a high speed frame rate, and a wide auto-focusing detection area is set while the image pickup unit operates at an ordinary frame rate, thereby setting an optimal auto-focusing area and realizing a proper auto-focusing.

According to the present invention, there is provided an auto-focusing apparatus in which a narrow auto-focusing detection area is set, together with a narrow display area of an auto-focusing area of a finder, while an image pickup unit operates at a high speed frame rate, and a wide auto-focusing detection area is set, together with a wide display area of the auto-focusing area of the finder, while the image pickup unit operates at an ordinary frame rate, thereby allowing a user to check the set auto-focusing area through the finder and hence reliably bringing a main subject into focus.

According to the present invention, there is provided an auto-focusing apparatus in which the feed amount of a focusing lens per frame interval is decreased when an image pickup unit operates at a high speed frame rate, and the feed amount of the focusing lens per frame interval is increased when the image pickup unit operates at an ordinary frame rate, thereby setting a focusing lens feed amount in accordance with each auto-focusing mode and hence realizing the proper auto-focusing without any quasi-focusing and the like.

According to the present invention, there is provided an auto-focusing apparatus in which the feed amount of a focusing lens per unit time when an image pickup unit is operates at a high speed frame time is set to be larger than that when the image pickup unit operates at an ordinary frame rate, thereby setting an in-focus state at a higher speed when the image pickup unit operates at the high speed frame rate.

According to the present invention, there is provided an auto-focusing apparatus in which an evaluation memory for storing autofocus evaluation values is used from address 0 regardless of whether an image pickup unit operates at a high speed frame rate or an ordinary frame rate, thereby attaining simplification of software.

According to the present invention, there is provided an auto-focusing apparatus in which an image obtained immediately before a high speed mode is set is always output to a display element when an image pickup unit operates at a high speed frame rate, and a video picture is output to the display element when the image pickup unit operates at an ordinary frame rate, thereby inhibiting any improper image from being output to the display element in a high speed auto-focusing mode.

According to the present invention, there is provided an auto-focusing apparatus in which when an image pickup unit returns to an ordinary frame rate after driven at a high speed frame rate, the number of frames driven at the high speed frame rate is set to an even number to facilitate construction of a system.

According to the present invention, there is provided an auto-focusing apparatus which includes an image pickup unit for performing at least signal processing for auto-focusing in the mode of reading data from the entire frame of an imager and operating at an ordinary frame rate and the mode of reading data from only the central portion of the frame of the imager and operating at a high speed frame rate, calculates an evaluation value for defining a direction in which a focusing lens is to be driven in a 1-frame interval in a high speed mode during an auto-focusing operation, and drives the focusing lens on the basis of the evaluation value, thereby obtaining an evaluation value in a short period of time and driving the focusing lens with a short delay.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 4A and 4B are timing charts showing the operation of the auto-focusing apparatus in a high speed auto-focusing mode;

FIGS. 9A and 9B are views showing auto-focusing detection areas;

FIGS. 11A and 11B are views showing finder frames in an ordinary auto-focusing mode and a high speed auto-focusing mode;

DETAILED DESCRIPTION OF THE INVENTION

Embodiments of the present invention will be described below with reference to the accompanying, drawing.

The first embodiment will be described first with reference to FIGS. 1 to 5.

Figure 1:
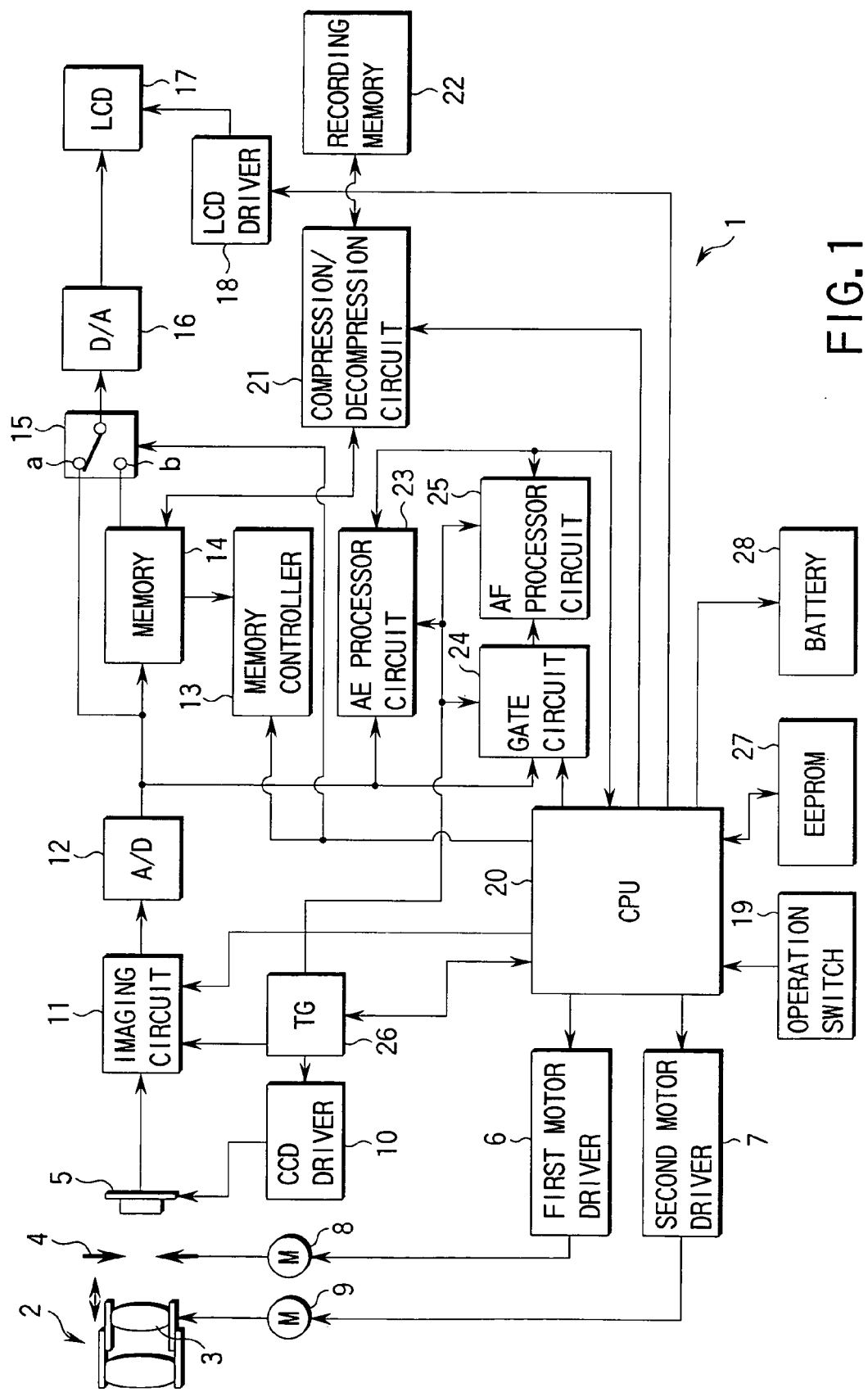
FIG. 1 is a block diagram showing the overall arrangement of a digital still camera according to the first embodiment of the present invention.

As shown in FIG. 1, a digital still camera 1 as an electronic image pickup instrument having the function of an auto-focusing apparatus according to the first embodiment of the present invention includes a focusing lens 3 in an imaging optical system 2 for performing an imaging operation. The focusing lens 3 is movable in the optical axis direction to perform a focus adjustment. A light beam passing through this imaging optical system 2 forms a subject image on a charge-coupled device (to be abbreviated to CCD) 5 serving as a solid state image sensor through an iris 4 and a shutter (not shown).

The iris 4 and the focusing lens 3 are respectively driven by first and second motors 8 and 9 to which driving signals are respectively supplied from first and second motor drivers 6 and 7. More specifically, the f-number of the iris 4 is changed by the first motor 8, and the focusing lens 3 is driven (moved) in the optical axis direction by the second motor 9. Note that the shutter is driven by a shutter driving circuit in an image pickup operation.

The CCD 5 is driven by a CCD driver 10. The signal obtained by the CCD 5 performing a photoelectric conversion upon reception of a read driving signal is input to an imaging circuit 11. A video signal is generated by this imaging circuit 11. This video signal is converted into a digital video signal (image data) by an A/D converter 12. The digital video signal is then stored in a memory 14 whose read and write operations are controlled by a memory controller 13.

In the video picture mode, the digital video signal from the A/D converter 12 is input to a D/A converter 16 through a contact a of a switch 15 to be converted into an analog video signal. This signal is then displayed as a video picture by a liquid crystal display (to be abbreviated to LCD) 17 serving as an image display at a predetermined frame rate (e.g., 1/30 sec). This LCD 17 is driven by an LCD driver 18.

When a release switch as an operation switch 19 is operated to perform a recording operation, the corresponding instruction signal is sent to a compression/decompression circuit 21 through a CPU 20. The image data in the memory 14 is then compressed by the compression circuit of the compression/decompression circuit 21 and stored in a recording memory 22.

In this embodiment, the release switch is a two-stroke switch. In first release operation in which the first release switch (1st release in FIG. 3 and the like) is turned on, AE and AF are performed. An actual image pickup operation is performed by second release switch (2nd release in FIG. 3 and the like) in which the second release switch is turned on.

When a reconstruction operation is performed, the corresponding instruction signal is sent to the compression/decompression circuit 21 through the CPU 20. As a result, the compressed image data stored in the recording memory 22 is decompressed by the decompression circuit of the compression/decompression circuit 21 and temporarily stored in the memory 14. This image data is input to the D/A converter 16 through a contact b of the switch 15, which is switched by the CPU 20, to be converted into an analog video signal. This signal is then input to the LCD 17 to be displayed as a reconstructed image on its screen.

The image data A/D-converted by the A/D converter 12 is input to an auto-exposure processor circuit (to be abbreviated to AE processor circuit) 23 and to an autofocus processor circuit (to be abbreviated to AF processor circuit) 25 through a gate circuit 24.

A timing signal from a timing generator (to be abbreviated to TG) circuit 26 is input to the AE processor circuit 23, the gate circuit 24, and the AF processor circuit 25. Note that this timing signal is also input to the CCD driver 10 and the imaging circuit 11.

The gate circuit 24 generates a gating signal in synchronism with this timing signal to define an image data area for AF processing by the AF processor circuit 25. More specifically, with the mediacy of the gate circuit 24, the AF processor circuit 25 can perform the AF processing in either the first mode (more specifically, the ordinary frame AF mode or ordinary AF mode) in which the AF processing is performed on the basis of 1-frame image data or the second mode (high speed frame AF mode or high speed AF mode) in which the AF processing is performed on the basis of only the image data of the predetermined portion, preferably, central portion of one frame which is set by the gate circuit 24.

When the auto-focusing is to be performed in the high speed AF mode, the CPU 20 outputs an instruction signal to the gate circuit 24. In this high speed AF mode, this gate is enabled in synchronism with the image data read out from a central area 29a of an imaging area 5a (of the CCD 5) in the vertical direction, as shown in FIG. 2B.

The AE processor circuit 23 calculates an AE evaluation value corresponding to the brightness of the subject by, for example, calculating the brightness of 1-frame image data, and outputs the evaluation value to the CPU 20.

Upon reception of the AE evaluation value input from the AE processor circuit 23, the CPU 20 refers to the proper AE evaluation value (AE reference data) previously stored in an EEPROM 27 and drives the motor 8 through the first motor driver 6 to obtain an AE evaluation value coinciding with the AE reference data, thereby automatically adjusting the f-number of the iris 4 or the gain of the imaging circuit 11. That is, the CPU 20 performs the AE processing.

In the ordinary AF mode, the AF processor circuit 25 extracts high frequency components from the brightness component of 1-frame image data by using a high-pass filter, calculates an AF evaluation value corresponding to the contour component amount or the like on the high frequency side by, for example, calculating a cumulative sum, and outputs the evaluation value to the CPU 20.

In the high speed AF mode, the AF processor circuit 25 extracts high frequency components from the brightness component of part of image data by using a high-pass filter or the like while the gate circuit 24 is enabled, calculates an AF evaluation value corresponding to the contour component amount or the like on the high frequency side by, for example, calculating a cumulative sum, and outputs the evaluation value to the CPU 20.

In an auto-focusing operation, the CPU 20 drives the motor 9 through the second motor driver 7 to move the focusing lens 3 by a predetermined feed amount in the optical axis direction, temporarily stores the AF evaluation value input from the AF processor circuit 25, at each position of the lens that is moved, in the register in the CPU, and sets the focusing lens 3 at the lens position where the maximum AF evaluation value is obtained. That is, the CPU 20 performs AF processing to drive the focusing lens 3 to the in-focus position.

Note that a predetermined timing signal synchronized with the frame rate is input from the TG circuit 26 to the CPU 20, and the CPU 20 performs various control operations in synchronism with this timing signal.

In this embodiment, when the auto-focusing is to be performed, the CPU 20 checks, on the basis of brightness information from the AE processor circuit 23, whether the brightness of the subject is equal to or higher than predetermined reference brightness. If the brightness of the subject is equal to or higher than the reference brightness, the CPU 20 controls the TG circuit 26 to change the period of a timing signal from the TG circuit 26 (more specifically, to shorten the period of a vertical sync signal (to be abbreviated to VD) output for each frame, i.e., the high speed AF mode).

The CCD driver 10, to which the timing signal from the TG circuit 26 is input, reads 1-frame data per $\frac{1}{30}$ sec in the ordinary AF mode, but outputs, for example, a 1-frame picture signal per $\frac{1}{60}$ sec in the high speed AF mode.

In this high speed AF mode, at least 0.1-frame picture signal is output from the CCD 5. In this mode, a high speed read operation is performed during the gate interval set by the gate circuit 24, and a high speed discarding operation in other intervals.

Figure 2A:
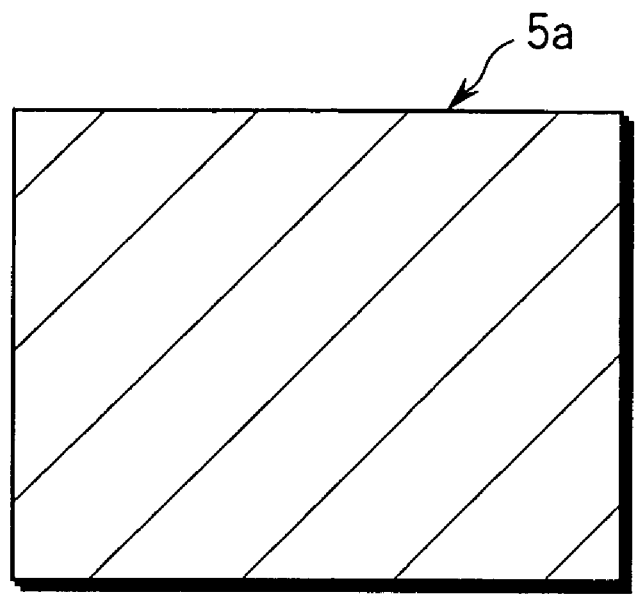
FIGS. 2A and 2B are views showing the imaging area of a CCD which is used for auto-focusing.
Figure 2B:
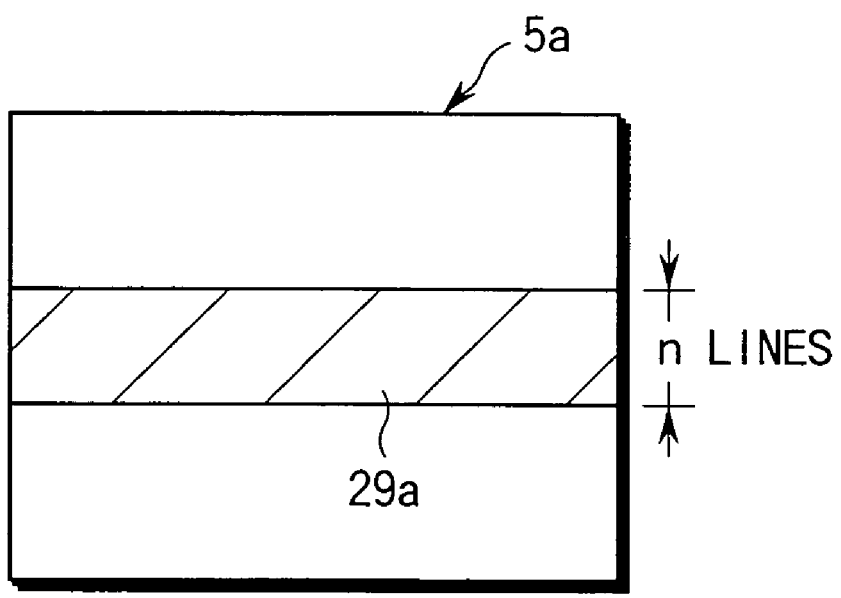

In the ordinary AF mode, as shown in FIG. 2A data is road out from all the lines of the imaging area 5a (of the CCD 5) indicated by hatching or the entire imaging area. In the high speed AF mode, however, as shown in FIG. 2B, a partial read operation is performed to read out data from the central area 29a, i.e., some lines (e.g., n lines) near the central portion of the imaging area 5a in the vertical direction which is indicated by hatching (the data in the white portions are discarded).

In this manner, the auto-focusing apparatus of this embodiment includes an image pickup unit that operates in the ordinary frame rate mode of driving the CCD 5 as an imager at an ordinary frame rate and performing an auto-focusing signal processing for the picture signal read out from the driven CCD 5, and in the high speed frame rate mode of driving the CCD 5 as an imager at a high speed frame rate and performing the auto-focusing signal processing for the picture signal read out from the driven CCD 5.

Figure 3:
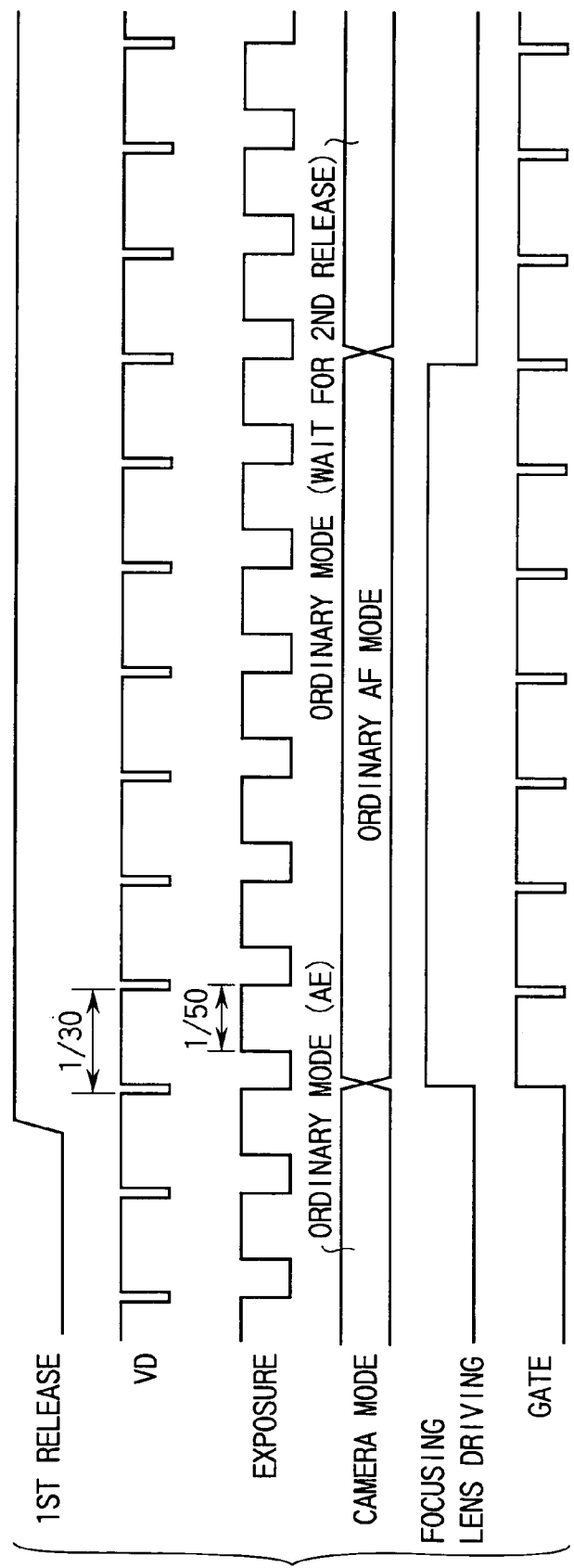
FIG. 3 is a timing chart showing the operation of an auto-focusing apparatus in an ordinary auto-focusing mode.

FIG. 3 is a timing chart showing the operation in the ordinary AF mode. Assume that when the AE processor circuit 23 performs AE processing for a video signal, an ordinary frame rate, i.e., the frame rate of a vertical sync signal, is set to $\frac{1}{30}$ sec, and an exposure time (imaging time) is set to be higher than the frame rate in the high speed AF mode (or $\frac{1}{60}$ sec, i.e., the maximum exposure time), e.g., $\frac{1}{50}$ sec. In this state, when the first release switch is turned on (the signal level is changed from "L" to "H" in FIG. 3), the camera mode (image pickup mode) shifts from the ordinary mode, in which the AE processing has been performed, to the ordinary AF mode.

In this ordinary AF mode, the CPU 20 drives the second motor 9 at $\frac{1}{30}$-sec intervals through the second motor driver 7 and drives (moves) the focusing lens 3 by a predetermined feed amount. The CCD 5 is exposed at each lens position, and the electrical signal obtained by the CCD 5 upon photoelectric conversion is converted into a video signal by the imaging circuit 11. This video signal is A/D-converted by the A/D converter 12. The A/D conversion signal, i.e., image data, is input to the AF processor circuit 25 through the gate circuit 24 which is enabled for $\frac{1}{30}$ sec. The AF processor circuit 25 extracts high frequency components from 1-frame digital image data, and calculates the cumulative sum of the components, thereby obtaining an AF evaluation value corresponding to an evaluation value in an in-focus state. The AF processor circuit 25 then outputs the obtained value to the CPU 20.

For example, the CPU 20 moves the focusing lens 3 in the hill-climbing direction of the AF evaluation value by an auto-focusing method based on the hill-climbing scheme. If the CPU 20 moves the focusing lens 3 to a lens position where the AF evaluation value decreases from the maximum AF evaluation value, and detects the peak of the AF evaluation value, the CPU 20 sets the focusing lens 3 at the lens position where the maximum AF evaluation value is obtained, and stops driving the focusing lens 3. In this state, the camera is set in the ordinary mode in which the auto-focusing is made, and the CPU 20 waits for second release operation.

The operation in the high speed AF mode is performed in accordance with the timing charts shown in FIGS. 4A and 4B. FIG. 4A shows the operation in the entire interval of the high speed AF mode. FIG. 4B shows the detailed operation in a 2-frame interval in this high speed AF mode interval.

Assume that when AE processing is performed by the AE processor circuit 23, an ordinary frame rate, i.e., the frame rate of a vertical sync signal, is set to 1/30 sec, and an exposure time (imaging time) is set to be higher than the frame rate in the high speed AF mode, e.g., 1/100 sec.

When the first release is turned on (the signal level is changed from "L" to "H" in FIGS. 4A and 4B), the camera mode (image pickup mode) shifts from the ordinary mode, in which AE processing has been performed, to the ordinary AF mode.

In this high speed AF mode, the CPU 20 outputs a timing setting instruction in the high speed AF mode to the TG circuit 26. The CPU 20 also outputs a gating instruction signal in the high speed AF mode to the gate circuit 24. The CPU 20 outputs a driving instruction signal to the second motor driver 7 to drive the second motor 9 at 1/60-sec intervals, thereby driving (moving) the focusing lens 3 by a predetermined feed amount.

The CCD 5 exposed (imaged) at each lens position outputs a photoelectric conversion signal to the imaging circuit 11. The photoelectric conversion signal is converted into a video signal by the imaging circuit 11. This signal is further A/D-converted by the A/D converter 12. The digital image data from the A/D converter 12 is input to the AF processor circuit 25 through the gate circuit 24.

In this high speed AF mode, the CCD output signal is discarded at a high speed until the gate circuit 24 is enabled or the image data corresponding to the central area 29a in FIG. 2B is read, as indicated by the output (CCD output) in FIG. 4B. That is, after the signal charge in the photoelectric conversion section of the CCD 5 is transferred to the vertical transfer section, the signal charge is transferred vertically with high speed vertical transfer clocks (vertical transfer signal). Similarly, this signal charge is discarded from the horizontal transfer section with a high speed horizontal transfer signal (the image data in this case is not used by the signal processing system for AF processing and the like). In addition, when the gate is disabled, the CCD output is also discarded at a high speed.

When the gate is enabled, a signal read is performed by using vertical and horizontal transfer signals as in the ordinary mode. Since signals are discarded at a high speed except for a case wherein the gate is enabled as described above, the time required to read a 1-frame signal is shortened, allowing an increase in frame rate.

The gate circuit 24 is enabled only in a period near the middle of each vertical sync interval (each interval during which a vertical sync signal is kept at "H") under the control of the CPU 20 (for example, the gate circuit 24 counts vertical transfer clocks (not shown) from the leading edge of a vertical sync signal (VD) by using the counter circuit incorporated in the gate circuit 24, and is enabled when the count value reaches the value corresponding to the timing when the horizontal line on the upper side of the central area 29a of the imaging area 5a shown in FIG. 2B is to be read).

When the counter circuit counts a predetermined number (e.g., n) after the count value reaches the value corresponding to the timing when the horizontal line on the upper side of the central area 29a is to be read, the gate circuit 24 is disabled. Note that FIG. 4B shows a horizontal sync signal (abbreviated to HD).

In this embodiment, since the high speed AF processing is performed by using the image data of a portion corresponding to the central area 29a, the auto-focusing can be performed at a speed much higher than that in a case wherein the entire area is used.

That is, in the high speed mode, data on the upper and lower sides of each frame are discarded at a high speed, the time required to read out 1-frame image data is much shorter than that in the ordinary mode. In the high speed mode, therefore, image data corresponding to two frames or more can be obtained within the time required to read 1-frame image data in the ordinary mode. This allows a high speed auto-focusing.

The AF processor circuit 25 extracts high frequency components from the image data in the interval during which the gate circuit 24 is enabled, calculates the cumulative sum of the components to calculate an AF evaluation value corresponding to the evaluation value in an in-focus state, and sends the evaluation value to the CPU 20.

When the CPU 20 sets the focusing lens 3 at the lens position corresponding to the maximum AF evaluation value, the CPU 20 stops driving the focusing lens 3, and sends a high speed AF mode end signal to the TG circuit 26 to restore the timing signals such as the vertical sync signal to ordinary rates (periods). As a result, the ordinary mode state in which the auto-focusing has been achieved is restored, and the CPU 20 waits for second release operation.

Note that programs used for various control operations by the CPU 20, data used for various operations, and the like are stored in the EEPROM 27 connected to the CPU 20 and serving as a nonvolatile read-only memory that can be electrically reprogrammed. These programs and data are read out to be used when the power supply of the digital still camera 1 is turned on. In addition, the CPU 20 detects the voltage of a battery 28. Upon detecting that the voltage becomes lower than a predetermined voltage, the CPU 20 causes the LCD 17 to display information indicating that the remaining quantity of the battery 28 is small or information encouraging the user to recharge or replace the battery.

This embodiment is characterized in that in the imaging mode of performing imaging (image recording), a program for determining, in accordance with the brightness of a subject, whether to perform the auto-focusing in the first or second mode is stored in the EEPROM 27.

The characteristic operation of this embodiment will be described next with reference to FIG. 5. When the power supply of this image pickup instrument 1 is turned on to set the imaging mode, the CPU 20 reads out program information from the EEPROM 27, and starts the processing shown in FIG. 5 in accordance with the program.

First of all, in step S1, setting for the timing generator (TG) is performed. More specifically, the CPU 20 outputs a setting instruction signal to the TG circuit 26 to perform an imaging operation at an ordinary frame rate. The TG circuit 26 outputs timing signals such as a vertical sync signal (VD) and a horizontal sync signal (HD) to the respective circuits to perform the imaging operation at an ordinary frame rate, e.g., one frame per 1/30 sec. In this case, the signal VD is set to 1/30 sec. This value is indicated on the right side of "step S1" in FIG. 5.

In step S2, auto-exposure processing (to be abbreviated to AE in FIG. 5 as well as in other drawings) is performed. With this processing, the exposure time corresponding to the brightness of the subject is set. In this processing, an AE evaluation value is sent to the CPU 20.

The CPU 20 checks in step S3 whether the first release operation is performed. In this processing, the imaging optical system 2 waits for a first release operation. When this first release operation is performed, the CPU 20 checks in step S4 whether the subject is bright or not. That is, the CPU 20 checks, on the basis of the AE evaluation value from the AE processor circuit 23, whether the brightness of the subject is equal to or higher than predetermined brightness.

If YES in step S4, the CPU 20 performs setting for the TG circuit 26 in step S5a. That is, the CPU 20 outputs a setting instruction signal to the TG circuit 26 to perform the imaging operation at a high speed frame rate. The TG circuit 26 outputs timing signals such as the signals VD and HD to the respective circuits to perform the imaging operation at a high speed frame rate, e.g., one frame per 1/60 sec. In this case, the signal VD is set to 1/60 sec. This value is indicated on the right side of "step 5a" in FIG. 5.

In step S5b, the high speed is performed. In this high speed AF processing, the focusing lens 3 is moved by the feed amount corresponding to the high speed frame rate, as shown in FIGS. 4A and 4B. The picture signal output from the CCD 5 at each lens position to which the focusing lens 3 is moved by this feed amount is input to the AF processor circuit 25 through the gate circuit 24 that passes only the image data corresponding to the central area 29a of the imaging area 5a.

The CPU 20 refers to the AF evaluation values obtained by the AF processor circuit 25 to move the focusing lens 3 to the lens position where the maximum AF evaluation value is obtained, thereby performing the high speed auto-focusing and setting the focusing lens 3 in an in-focus state. After the focusing lens 3 is set in the in-focus state, setting for the timing generator is performed in step S5c. More specifically, the CPU 20 outputs a setting instruction signal to the TG circuit 26 to perform the imaging operation at an ordinary frame rate. As a result, the TG circuit 26 is set in the state wherein timing signals are output at the ordinary frame rate, as in step S1. The flow then shifts to step S6.

If NO in step S4, the ordinary AF processing is performed in step S5d. In this case, as described with reference to FIG. 3, the CPU 20 moves the focusing lens 3 in the optical axis direction by the feed amount corresponding to the ordinary frame rate. The picture signal output from the CCD 5 at each lens position to which the focusing lens 3 is moved by this feed amount is input, as 1-frame image data corresponding to the imaging area 5a, to the AF processor circuit 25 through the gate circuit 24.

The CPU 20 refers to the AF evaluation values obtained by the AF processor circuit 25 to move/set the focusing lens 3 at the lens position where the maximum Af evaluation value is obtained, thereby performing the ordinary auto-focusing and setting the focusing lens 3 in an in-focus state.

Upon setting the focusing lens 3 in the in-focus state, the CPU 20 checks in step S6 whether the first release operation is canceled.

IF YES in step S6, the flow returns to step S2 to perform AE processing and the like. In contrast to this, if NO in step S6, the CPU 20 checks in step S7 whether second release operation is performed.

If NO in step S7, the flow returns to step S6 to check whether first release operation is canceled. In contrast to this, if YES in step S7, the CPU 20 performs setting for the timing generator for actual exposure operation in step S8.

The CPU 20 outputs proper exposure time information to the TG circuit 26 by referring to the AE result in step S2. The TG circuit 26 sets a timing signal for operating the shutter driving circuit to close the shutter after the lapse of the proper exposure time, and a timing signal for transferring the signal charge stored in the photoelectric conversion section to the transfer section after the lapse of the proper exposure time for the CCD driver 10.

In step S9, the CPU 20 performs the imaging operation. The CPU 20 sets the iris 4 to a proper f-number, and causes the TG circuit 26 to close the shutter in a proper exposure time. The CPU 20 also causes the CCD driver 10 to transfer the signal charge in the imaging section (photoelectric conversion section) of the CCD 5 to the transfer section. After the transfer operation, the CCD driver 10 supplies read signals (vertical and horizontal transfer signals) to the CCD 5 to output the signal charge in the transfer section from the CCD 5.

The output signal from the CCD 5 is temporarily stored in the memory 14 through the imaging circuit 11 and the A/D converter 12. The compressed image data is then recorded on the recording memory 22 through the compression/decompression circuit 21. The CPU 20 also stores, in the EEPROM 27, information indicating that 1-frame image data is recorded. The number of frames previously recorded (frame count) is incremented by one to update the information of the number of frames recorded. After the imaging processing is completed in this manner, the flow returns to step S1 again to prepare for the next image pickup operation.

According to this embodiment, when the subject is bright, the auto-focusing is performed at the high speed frame rate, whereas when the subject is dark, the auto-focusing is performed by using all the image data in the imaging area 5a. Therefore, the high speed auto-focusing can be performed for a bright scene, and the high-precision auto-focusing can be performed for a dark scene.

When the auto-focusing is to be performed at the high speed frame rate, the auto-focusing is performed by using only the image data in a portion of the imaging area 5a, and the remaining image data is discarded at a high speed. This allows the auto-focusing at a speed higher than that in a case wherein the auto-focusing is performed by using all the image data in the imaging area 5a.

The second embodiment of the present invention will be described next with reference to FIG. 6. The hardware arrangement of this embodiment is the same as that shown in FIG. 1. In the first embodiment, whether to use the high speed AF mode or the ordinary AF mode is determined in accordance with the brightness. In this embodiment, whether to use the high speed AF mode or the ordinary AF mode is determined in accordance with the remaining quantity of a battery 28.

Figure 5:
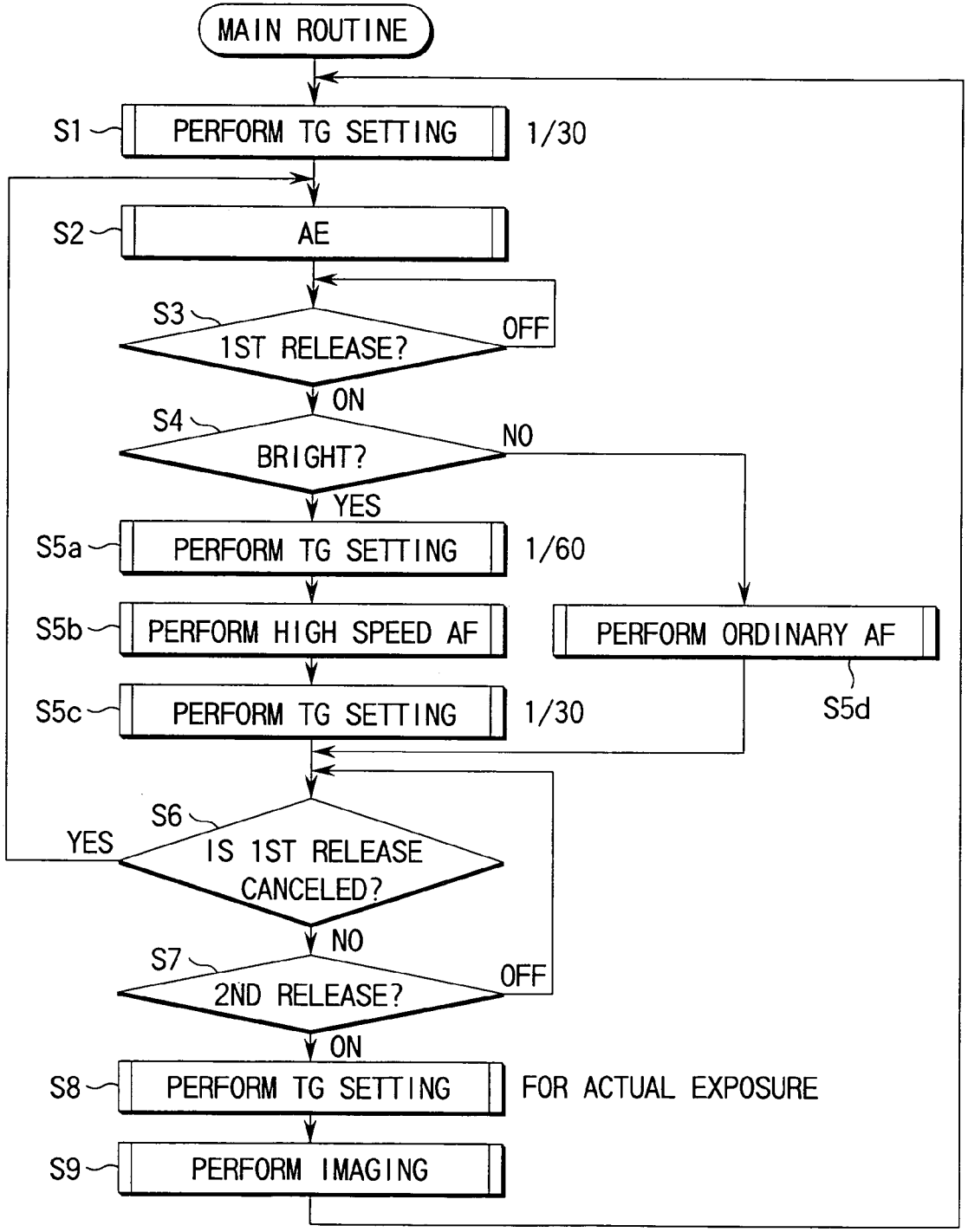
FIG. 5 is a flow chart showing the contents of the operation of the auto-focusing apparatus of the first embodiment.
Figure 6:
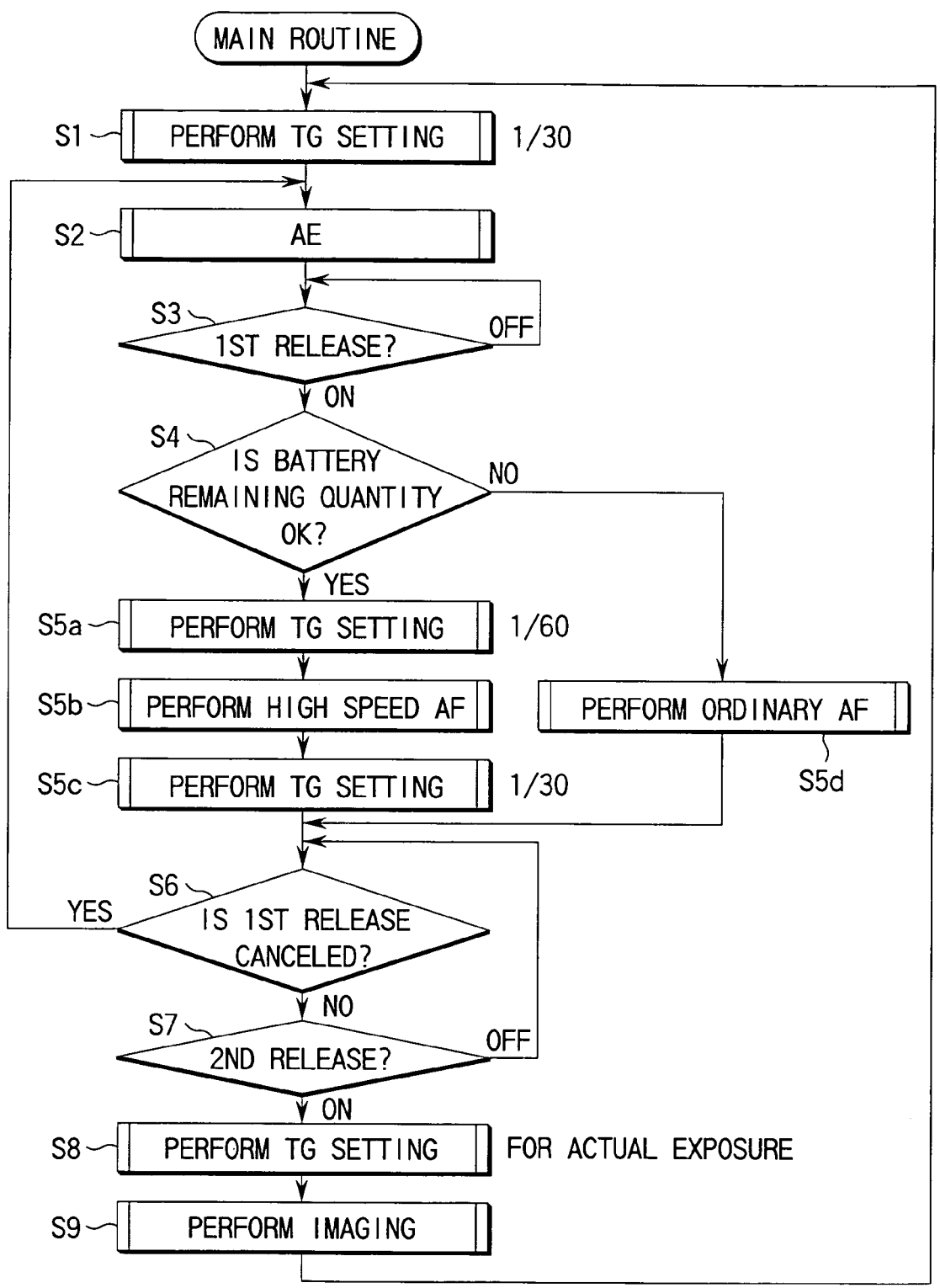
FIG. 6 is a flow chart showing the contents of the operation of an auto-focusing apparatus according to the second embodiment of the present invention.

In the flow chart shown in FIG. 6, the brightness determination processing in step S4 in FIG. 5 is replaced with the processing of determining whether the battery remaining quantity is "OK" in step S4'.

More specifically, a CPU 20 checks, for example, the voltage of the battery 28. If the CPU 20 determines that this voltage is high enough to perform the auto-focusing in the high speed AF mode, the CPU 20 performs the high speed AF processing in step S5b after the setting processing for the timing generator in step S5a. In contrast to this, if the CPU 20 determines that the battery remaining quantity does not allow the auto-focusing in the high speed AF mode without any problem in the image pickup operation or the like afterward, the CPU 20 performs the auto-focusing in the ordinary AF mode in step S5d. Such processing is performed because a large amount of power is consumed to discard the image data of the upper and lower sides of a frame at a high speed in the high speed AF mode.

Other operations are the same as those in the flow chart shown in FIG. 5. According to this embodiment, the auto-focusing is performed in accordance with the battery remaining quantity. More specifically, when the battery remaining quantity is sufficient, the high speed AF processing that consumes large battery power is performed, whereas when the battery remaining quantity is not sufficient, an ordinary AF auto-focusing that consumes small battery power is performed. This prevents interruption of image pickup operation due to a shortage of battery power that is caused by frequent use of high speed AF mode demanding large battery power consumption when the battery remaining quantity is not sufficient.

Note that this embodiment may be modified as follows. The brightness determination processing in step S4 in FIG. 5 is performed between step S4' and step S5a. If the brightness of the subject is equal to or higher than the predetermined brightness, the flow advances to step S5a. Otherwise, the auto-focusing is performed in the ordinary AF mode in step S5d.

That is, the auto-focusing is performed in the high speed AF mode only when the battery remaining quantity is sufficient and the brightness of the subject is equal to or higher than the predetermined brightness. Otherwise, the auto-focusing is performed in the ordinary AF mode. This modification has the effects of both the first and second embodiments.

The third embodiment of the present invention will be described next with reference to FIG. 7. In this embodiment, a speed-priority auto-focusing is performed. The hardware arrangement of this embodiment is the same as that shown in FIG. 1. In the first embodiment, whether to use the high speed AF mode or the ordinary AF mode is determined in accordance with the brightness. In this embodiment, the auto-focusing in the high speed AF mode is preferentially performed first. If the focusing lens 3 cannot be set in an in-focus state by this high speed AF mode, the auto-focusing is performed in the ordinary AF mode.

Figure 7:
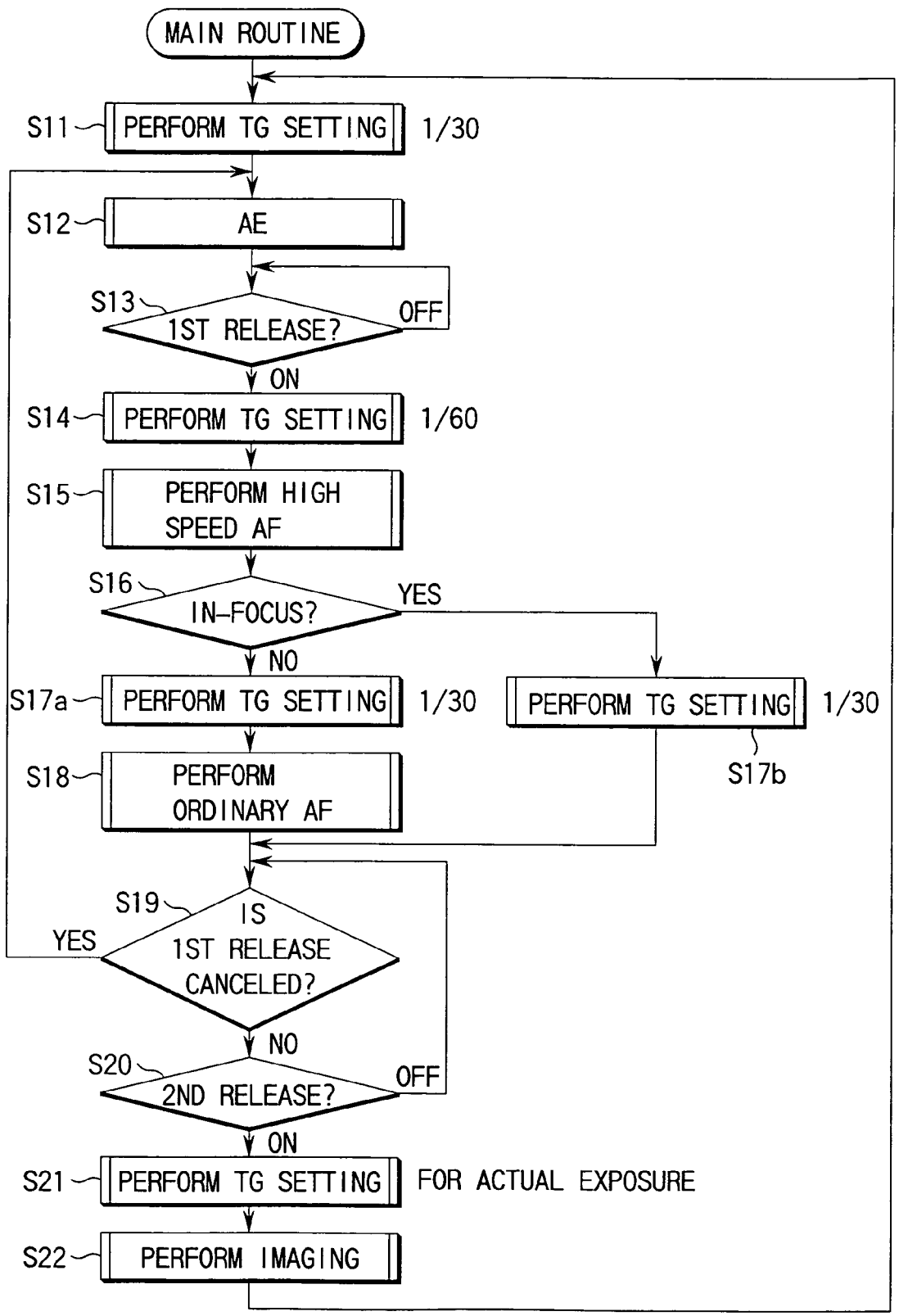
FIG. 7 is a flow chart showing the contents of the operation of an auto-focusing apparatus according to the third embodiment of the present invention.

Steps S11 to S13 in the flow chart shown in FIG. 7 are the same as steps S1 to S3 in FIG. 5, and a description thereof will be omitted. When the first release operation is performed, setting processing for the timing generator is performed in step S14 (timing for high speed AF is set as in step S5a in FIG. 5). In step S15, the auto-focusing is performed in the high speed AF mode.

After this high speed AF processing, it is checked in step S16 whether an in-focus state is obtained. A CPU 20 determines an in-focus state by, for example, checking whether the peak value of AF evaluation values can be detected or becomes indefinite due to an error.

If the CPU 20 determines that an in-focus state cannot be obtained as in a case wherein any noticeable AF evaluation value cannot be obtained as compared with other AF evaluation value upon movement of a focusing lens 3, and detection of a peak value fails, the timing for the ordinary frame rate is set by a timing generator setting in step S17a. In step S18, the auto-focusing is performed by an ordinary AF processing. The flow then advances to step S19.

If the CPU 20 determines that the focusing lens 3 is set in the in-focus state, the flow advances to step S19 to check whether the first release operation is canceled, after the frame rate is restored to: the ordinary frame rate by the timing generator setting in step S17b. If YES in step S19, the flow returns to step S12 in which the AE processing is performed. If NO in step S19, the CPU 20 checks in step S20 whether the second release operation is performed.

If NO in step S20, the flow returns to step S19. If YES in step S20, the CPU 20 performs the timing generator setting for an actual exposure operation in step S21 and an image pickup processing in step S22. The flow then returns to step S11. The processing in steps S21 and S22 is the same as that in steps S8 and S9 in FIG. 5, and a description thereof will be omitted.

According to this embodiment, since the auto-focusing is preferentially performed in the high speed AF mode, the auto-focusing can be performed at a high speed in many cases. Even if the auto-focusing cannot be performed in the high speed AF mode, the high-precision auto-focusing can be performed in the ordinary AF mode.

The fourth embodiment of the present invention will be described next with reference to FIGS. 8 and 9. In the first embodiment, as shown in FIGS. 2A and 2B, when the auto-focusing is to be performed in the high speed AF mode, the AF detection area is the central area 29a in the vertical direction, which is narrow, whereas when the auto-focusing is to be performed in the ordinary AF mode, the AF detection area is the entire imaging area 5a, which is wide. In this embodiment, the auto-focusing is performed after an AF detection area is set to a more proper range within each of the above ranges.

In this embodiment, in the ordinary AF mode, a relatively wide area of an imaging area 5a, excluding a peripheral portion, is set as an AF detection area 30a, as shown in FIG. 9A. In the high speed AF mode, as shown in FIG. 9B, a central portion extending laterally in a central area 29a is set as an AF detection area 30b.

In the ordinary mode, for example, a gate circuit 24 is enabled at the timing when image data corresponding to the AF detection area 30a is input, and is disabled at the timing when image data corresponding to the portion outside the AF detection area 30a: is input.

In addition, in the high speed AF mode as well, the gate circuit 24 is enabled at the timing when image data corresponding to the AF detection area 30b is input, and is disabled at the timing when the image data corresponding to the portion outside the AF detection area 30b is input.

The operation of this embodiment will be described next with reference to the flow chart of FIG. 8. Steps S31 to S33 in FIG. 8 are the same as steps S1 to S3 in FIG. 5.

If it is determined in step S33 that the first release operation is performed, it is checked in step S34 whether the auto-focusing is to be performed in the high speed AF mode. That is, a CPU 20 checks whether the AF mode selected with an AF mode selection switch is the high speed AF mode. Alternatively, if no AF mode is selected with the AF mode selection switch, the CPU 20 checks, on the basis of the brightness, whether the high speed AF mode is used.

If the auto-focusing is to be performed in the high speed AF mode, a small area is set (i.e., the gate circuit 24 is set to be enabled at the image data portion of the AF detection area 30b in FIG. 9B) in step S35a, and the timing generator setting is performed in step S35b. In step S35c, the high speed AF processing is performed. Furthermore, in step 535d, the timing generator setting is performed. The flow then advances to step S36.

If the CPU 20 determines that the auto-focusing is not performed in the high speed AF mode, the CPU 20 controls the gate circuit 24 to perform a large area setting processing in step S35e (i.e., the gate circuit 24 is set to be enabled at the image data portion of the AF detection area 30a in FIG. 9A). Thereafter, the CPU 20 performs the auto-focusing in the ordinary AF mode in step S35f, and checks in step S36 whether the first release operation is canceled.

If YES in step S36, the flow returns to step S32. If NO in step S36, the CPU 20 checks in step S37 whether the second release operation is performed.

If NO in step S37, the flow returns to step S36. If YES in step S37, the CPU 20 performs the timing generator setting for an actual exposure operation in step S38, and the performing the image pickup operation in step S39. Thereafter, the flow returns to step S31 to prepare the next image pickup operation. The processing in steps S36 to S39 is the same as that in steps S6 to S9 in FIG. 5, and a description thereof will be omitted.

According to this embodiment, since the more proper AF areas 30a and 30b are set by excluding the peripheral portions of the imaging area 5a, a better auto-focusing can be performed. In most cases, therefore, a subject is image-picked up after the auto-focusing is centered on the subject.

If, however, an unexpected object or the like is present on the peripheral side of the subject in the center of the AF detection area, the AF evaluation value for focusing the camera on the subject may be affected by the AF evaluation value obtained from the object on the peripheral side. As a result, the in-focus position with respect to the subject tends to shift. According to this embodiment, since the peripheral portion is excluded from the AF detection area, the better auto-focusing can be performed.

The fifth embodiment of the present invention will be described next with reference to FIGS. 10 to 11B.

According to this embodiment, a finder frame corresponding to an AF detection area is set in the fourth embodiment of the present invention. More specifically, in the ordinary AF mode, a large (wide) finder frame 31 is set as a measurement frame in a finder 31, as shown in FIG. 11A, whereas in the high speed AF mode, a small (narrow) finder frame 31b is set, as shown in FIG. 11B.

The operation of this embodiment will be described with reference to the flow chart of FIG. 10. The flow chart in FIG. 10 is the same as that in FIG. 8 except that step 35g of setting the small finder frame is inserted between step S35a and step S35b, and step S35h of setting the large finder frame is inserted between step S35e and step S35f.

If it is determined in step S34 that the auto-focusing is to be performed in the high speed AF mode, the small area (an AF detection area 30 in the central portion) is set in step S35a, and the small finder frame 31b (corresponding to the small area in FIG. 11B) is set in step S35g. Thereafter, the timing generator setting for the high speed AF mode is performed in step S35b, and the high speed AF processing is performed in step S35c.

If it is determined that the auto-focusing is not performed in the high speed AF mode, the large area is set in step S35e, and the large finder frame 31a (corresponding to the large area in FIG. 11A) is set in step S35h. Thereafter, the ordinary AF processing is performed in step S35f.

Figure 10:
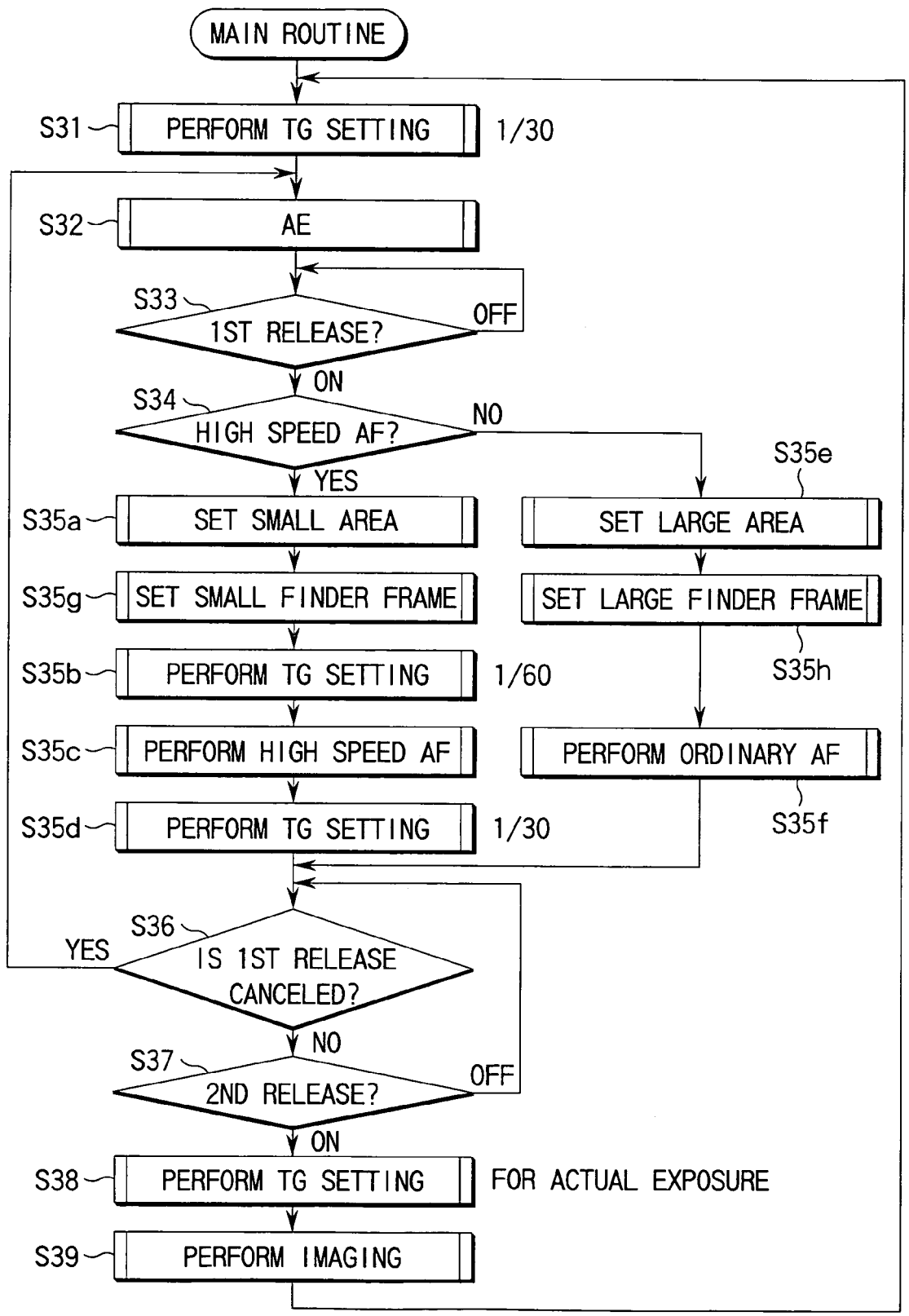
FIG. 10 is a flow chart showing the contents of the operation of an auto-focusing apparatus according to the fifth embodiment of the present invention.

Since the remaining steps are the same as those in FIG. 10, a description thereof will be omitted. According to this embodiment, since set AF areas 30a and 30b can be checked through the finder frames 31a and 31b, the camera can be reliably focused on the main portion of the subject.

The "finder" in this embodiment indicates an LCD 17 used as a finder, and the finder frames 31a and 31b are displayed on the LCD 17 by a LCD driver 18.

Figure 12:
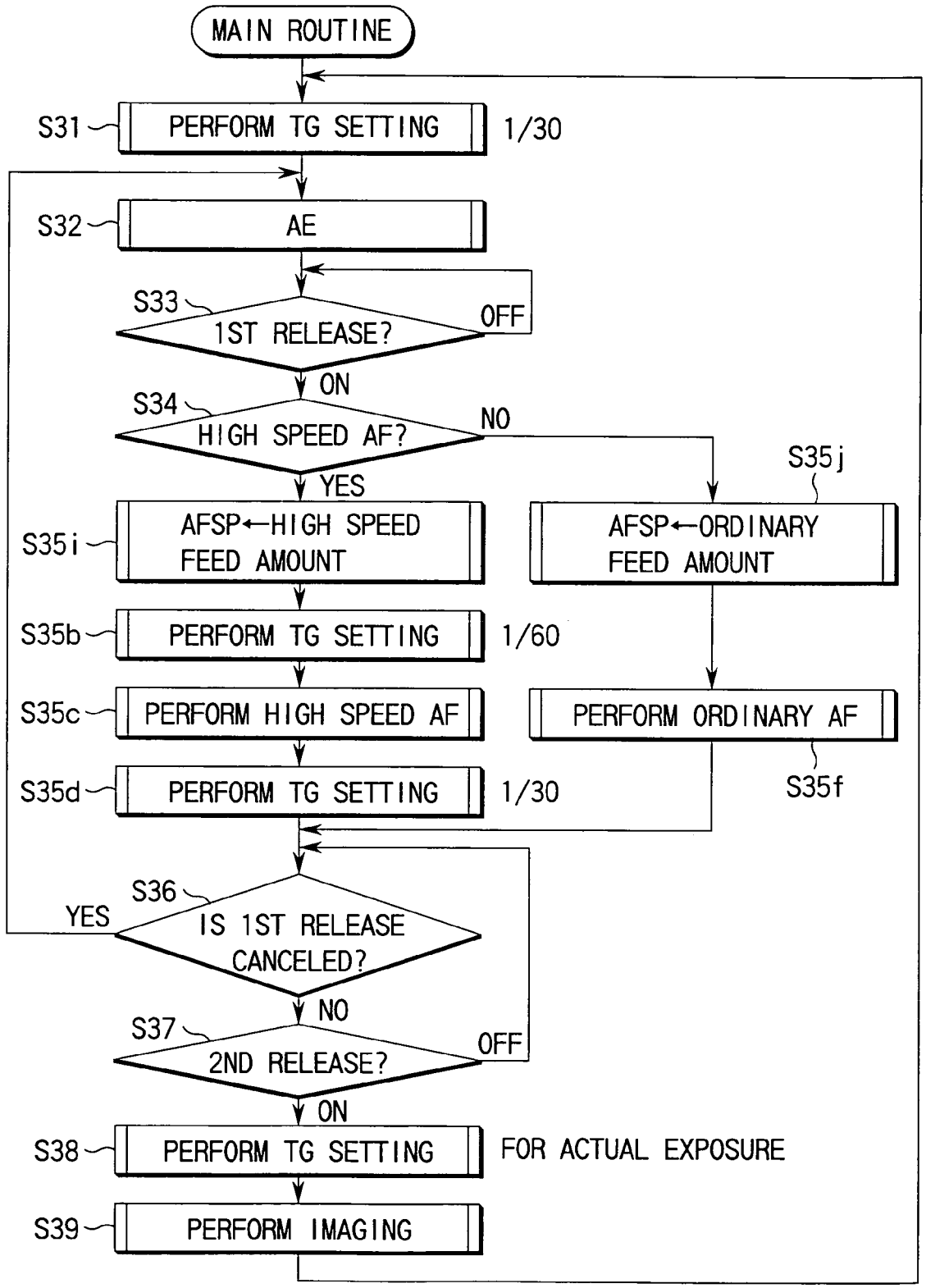
FIG. 12 is a flow chart showing the contents of the operation of an auto-focusing apparatus according to the sixth embodiment of the present invention.

The sixth embodiment of the present invention will be described next with reference to FIG. 12. In this embodiment, when the auto-focusing is to be performed in the high speed AF mode, the feed amount per unit high speed frame time is reduced. When the auto-focusing is to be performed in the ordinary AF mode, the feed amount per unit normal frame time is increased.

The operation of this embodiment will be described with reference to the flow chart of FIG. 12. According to the flow chart of FIG. 12, a high speed feed amount setting is performed in place of step S35a, and an ordinary feed amount setting is performed in place of step S35e.

More specifically, if it is determined in step S34 that the auto-focusing is to be performed in the high speed AF mode, the feed amount in the high speed AF mode is set to a variable AFSP that determines a feed amount in step S35i of setting a feed amount for the high speed AF mode. After the timing generator setting for the high speed AF mode is performed in step S35b, the auto-focusing is performed in the high speed AF mode. In the high speed AF mode, a focusing lens 3 is moved by the feed amount set in the variable AFSP in each 1-frame interval, and an AF evaluation value is obtained at each lens position to which the focusing lens 3 is moved.

If it is determined in step S34 that the auto-focusing is not performed in the high speed AF mode, the feed amount in the ordinary AF mode is set to the variable AFSP that determines a feed amount in step 34j of setting a feed amount for the ordinary AF mode. In step S34f, the auto-focusing is performed in the ordinary AF mode.

Figure 8:
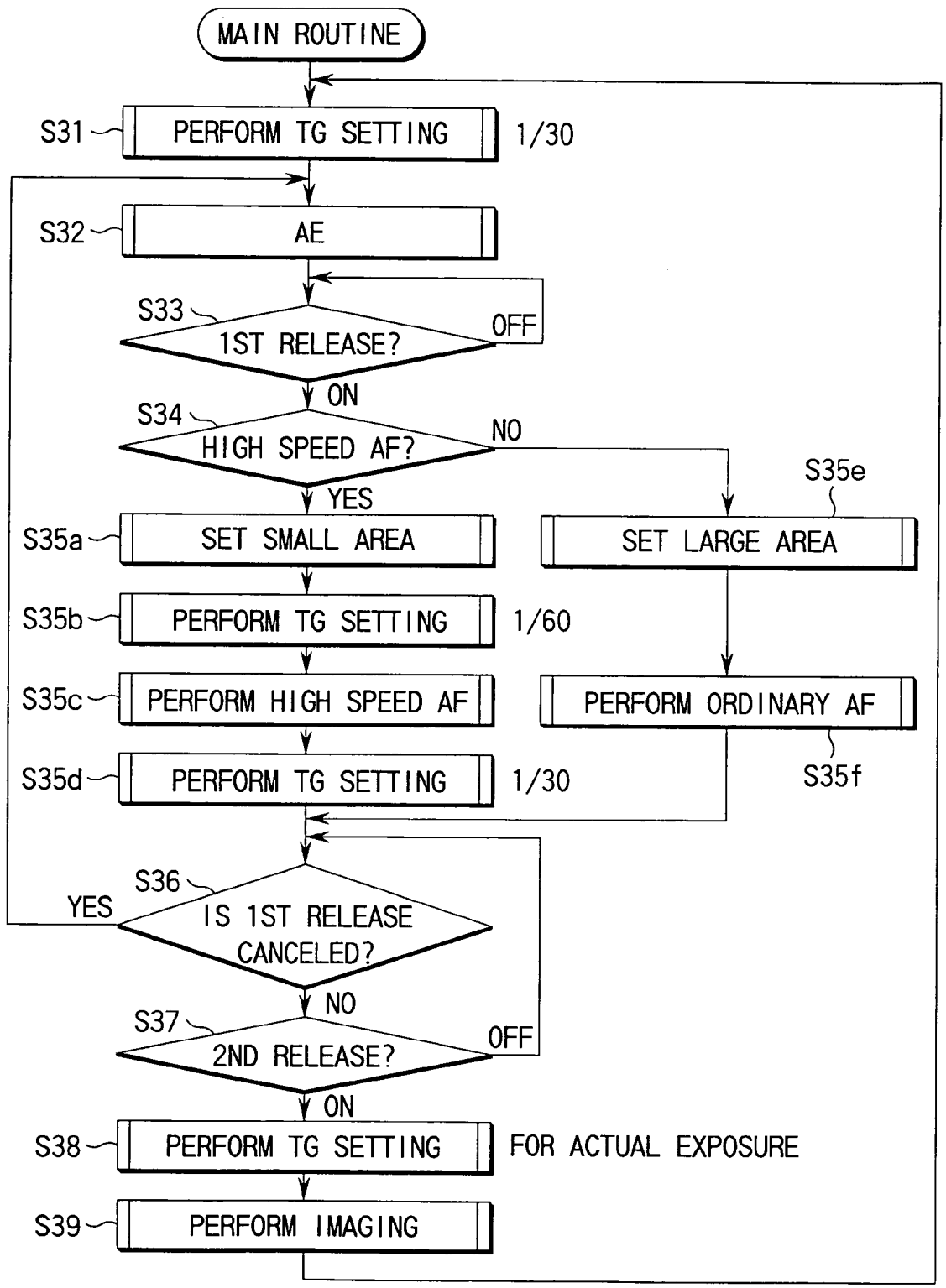
FIG. 8 is a flow chart showing the contents of the operation of an auto-focusing apparatus according to the fourth embodiment of the present invention.

Other operations are the same as those in FIG. 8. In this embodiment, the feed amount per high speed frame in the high speed AF mode is set to be smaller than that in the ordinary AF mode. That is, in this embodiment, although the auto-focusing is performed at a high speed (in a short period of time) in the high speed AF mode, the lens feed amount in the high speed AF mode is set to be smaller than that in the ordinary AF mode to realize the high-precision auto-focusing, thereby preventing a quasi-focusing in spite of the face that the auto-focusing is performed at a high speed.

If, for example, the frame rate in the high speed AF mode is twice that in the ordinary mode (or the high speed frame time is ½ the ordinary frame time), the feed amount per frame in the high speed AF mode is set to be ½ that in the ordinary AF mode.

In this case, in the high speed AF mode, an AF evaluation is obtained by measurement for each lens feed amount ½ that in the ordinary AF mode, thereby realizing the high-precision auto-focusing and preventing the quasi-focusing. In the above example, the lens feed amount per unit time remains the same in both the modes. However, the present invention is not limited to this.

According to this embodiment, in the high speed AF mode, the feed amount per frame (1-frame interval in the high speed AF mode) is decreased, whereas in the ordinary AF mode, the feed amount per frame (1-frame interval in the ordinary AF mode) is increased. With this setting, a feed amount suitable for each AF mode can be set, and hence the proper auto-focusing can be performed with less quasi-focusing as compared with other cases.

This embodiment can be modified such that the lens feed amount per predetermined time in the high speed AF mode is set to be larger than that in the ordinary AF mode to realize a faster auto-focusing.

In this case as well, the high-speed auto-focusing can be realized by changing the set value of the high speed feed amount in step S35*i* and the set value of the ordinary feed amount in step S35*j*.

In this case, a precision-priority auto-focusing, speed-priority auto-focusing, or auto-focusing with consideration given to both the functions may be performed by changing the ratio of the lens feed amount per predetermined time in the high speed AF mode to that in the ordinary AF mode.

The seventh embodiment of the present invention will be described next with reference to FIGS. 13 and 14. In this embodiment, an AF evaluation memory for AF evaluation is used from address 0 in either F mode.

Figure 13:
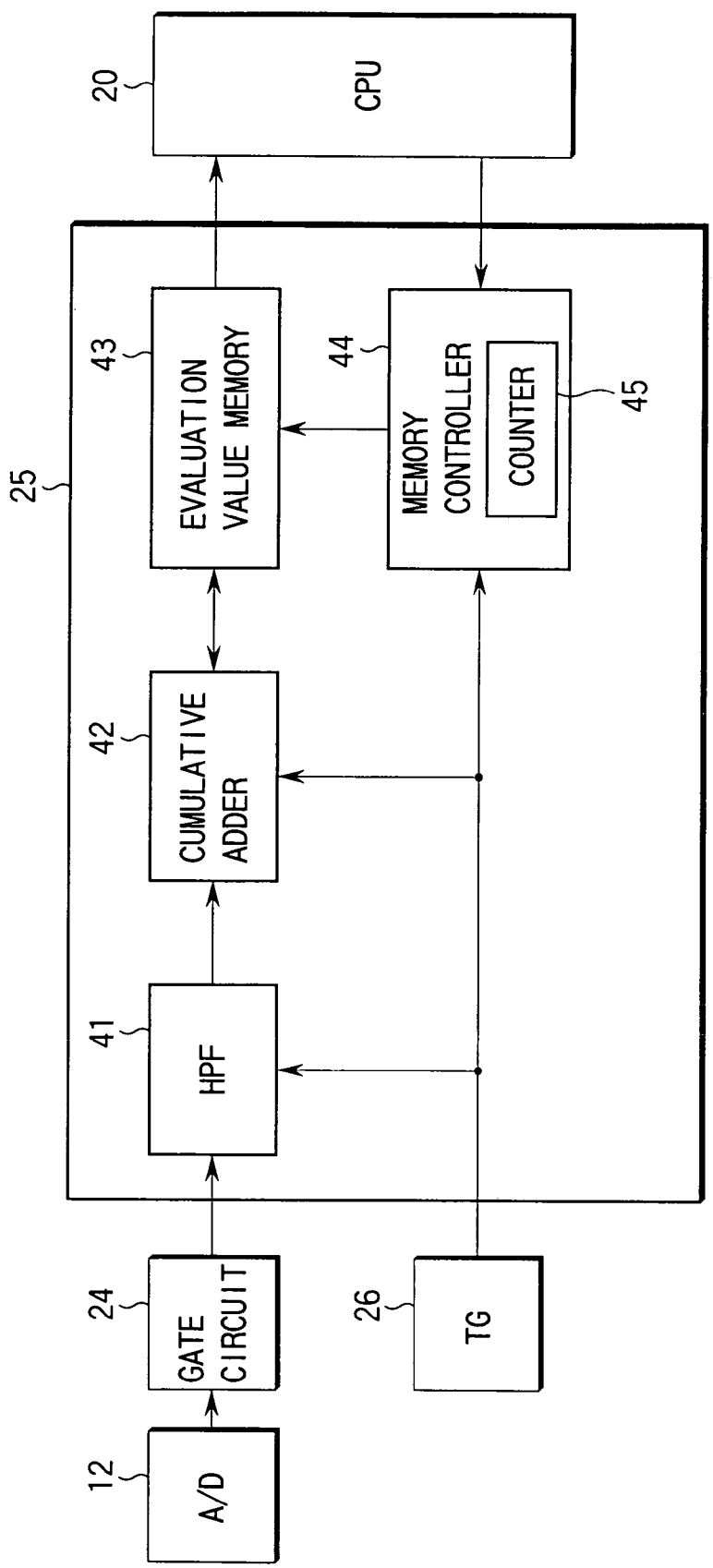
FIG. 13 is a block diagram showing the arrangement of an auto-focusing circuit according to the seventh embodiment of the present invention.

In this embodiment the arrangement of the AF processor circuit 25 in FIG. 1 is replaced with the arrangement shown in FIG. 13, and the remaining arrangements are the same as those in the first embodiment.

When the image data passing through a gate circuit 24 is filtered by a high-pass filter (to be abbreviated to HPF) 41, high frequency components are extracted from the image data. The extracted high frequency components are cumulatively added by a cumulative adder 42 on the next stage, and the cumulatively added AF evaluation value is input to an evaluation memory 43.

A write and read of AF evaluation values in/from the evaluation memory 43 are controlled by a memory controller 44. This memory controller 44 incorporates a counter 45 for designating write and read addresses of AF evaluation values in the evaluation memory 43.

The TG circuit 26 sends a timing signal to the HPF 41, the cumulative adder 42, and the memory controller 44. The operations of the respective components are performed in synchronism with the timing signal. A CPU 20 controls the memory controller 44 to obtain the AF evaluation value data stored in the evaluation memory 43.

Figure 14A:
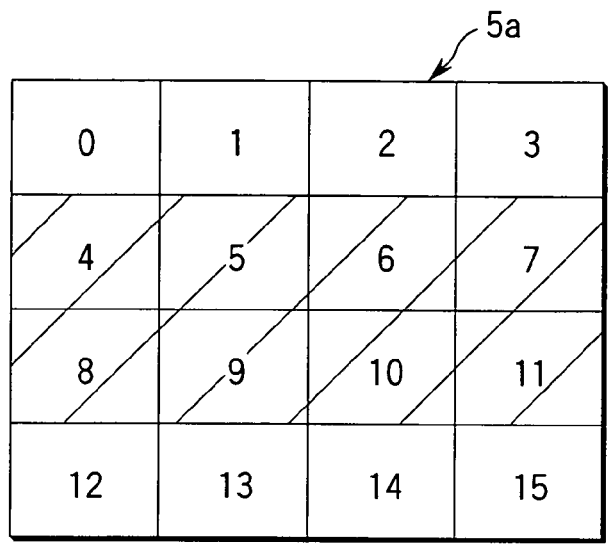
FIGS. 14A, 14B, and 14C are views for explaining the contents of the operation of the auto-focusing apparatus of the seventh embodiment.

In this embodiment, an imaging area 5*a* for AF detection is divided into 16 areas 0 to 15, as shown in FIG. 14A. In the ordinary AF mode, the auto-focusing is performed by using all areas 0 to 15 of the imaging area 5*a*. In the high speed AF mode, the auto-focusing is performed by using hatched areas 4 to 11 in FIG. 14A.

Figure 14B:
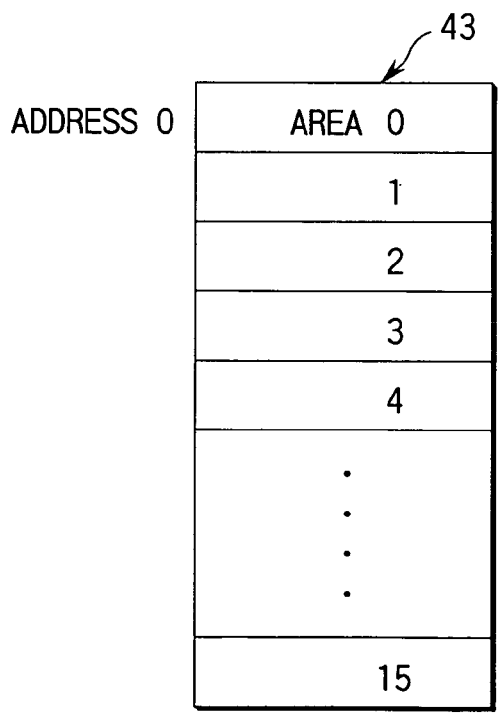

The AF evaluation values obtained in accordance with the image data in areas i (i=0 to 15) are stored in the evaluation memory 43. In this case, in the ordinary AF mode, the AF evaluation values from area 0 of address 0 are sequentially stored, as shown in FIG. 14B.

Figure 14C:
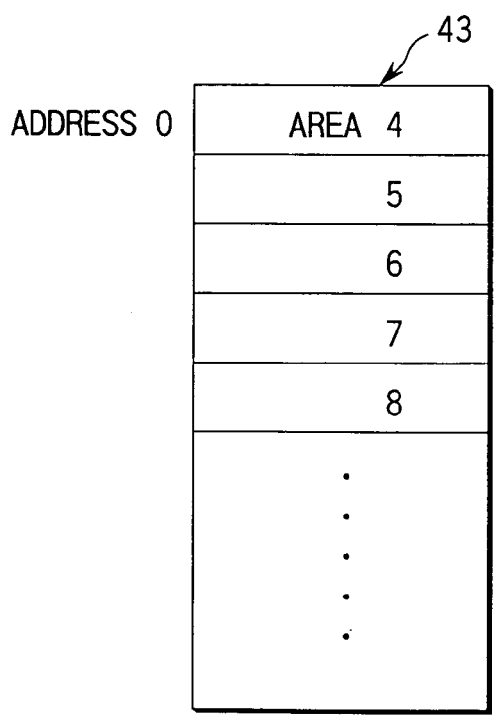

In the high speed AF mode, the gate circuit 24 is disabled in the intervals between areas 0 to 3 and between areas 12 to 15, and no image data is input to the AF processor circuit 25. Hence, no AF evaluation values are present. For this reason, as shown in FIG. 14C, the AF evaluation values from areas 4 to 11 are sequentially stored in the evaluation memory 43, starting from address 0.

According to this embodiment, since the evaluation memory 43 for AF evaluation is used from address 0 in either AF mode, simplification of software can be achieved. Other arrangements have the same functions and effects as those in the first embodiment.

Figure 15:
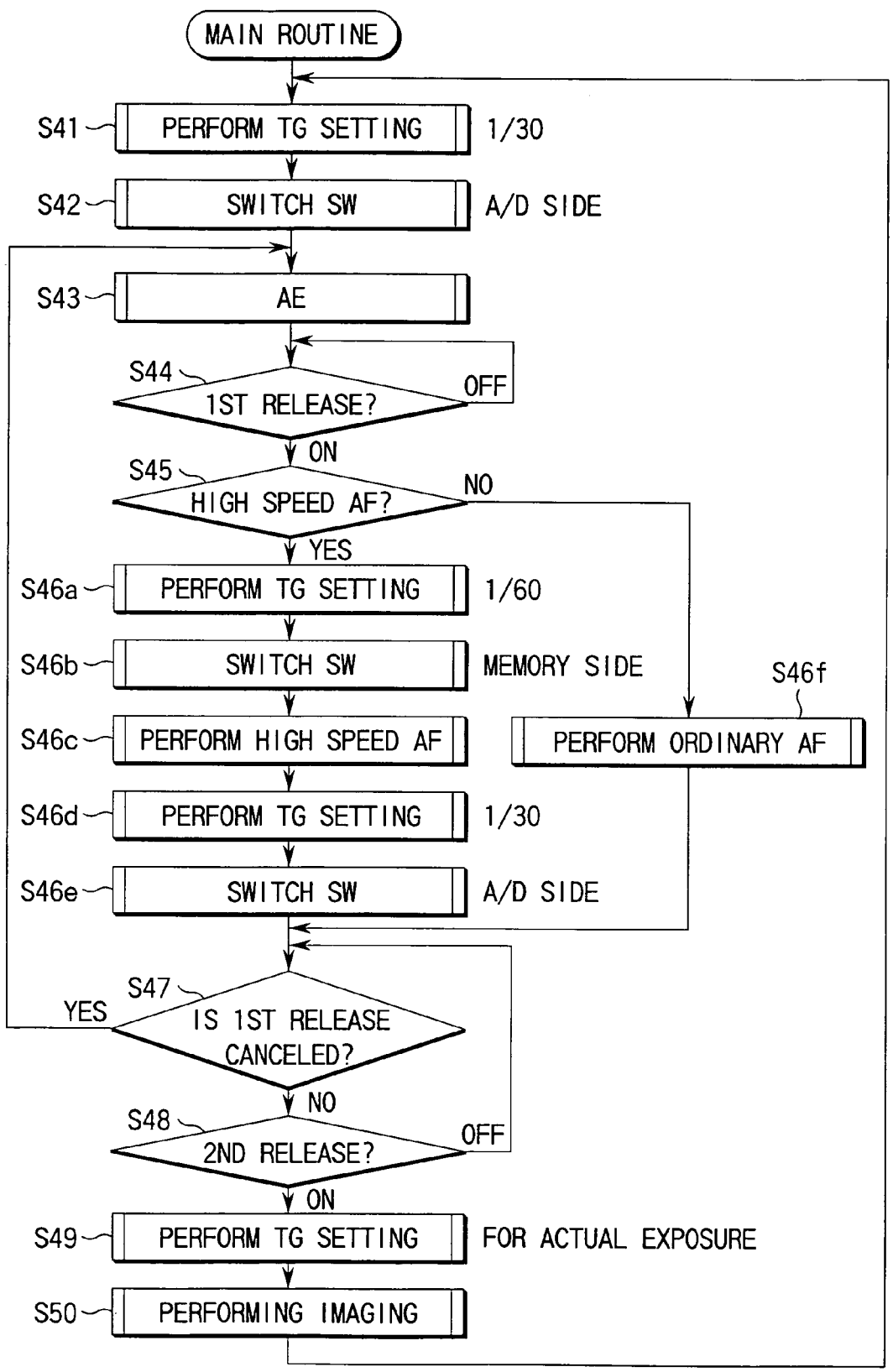
FIG. 15 is a flow chart showing the contents of the operation of an auto-focusing apparatus according to the eighth embodiment of the present invention.

The eighth embodiment of the present invention will be described with reference to FIGS. 15 and 16. According to this embodiment, in the high speed AF mode, an image obtained immediately before the high speed AF mode is set is displayed on an LCD 17, whereas in the ordinary AF mode, a video picture is displayed on the LCD 17.

Figure 16:
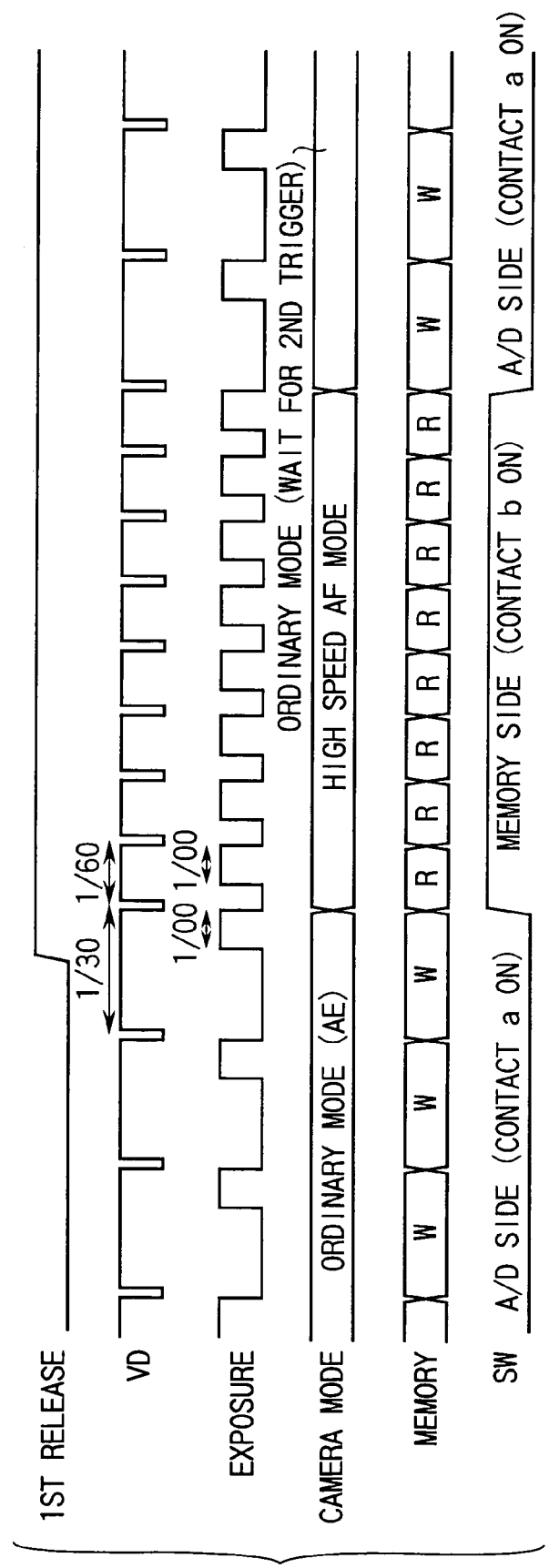
FIG. 16 is a timing chart showing image display operation in the high speed auto-focusing mode in the eighth embodiment.

The timing chart of FIG. 16 is identical to that shown in FIG. 4A except that a memory 14 is in a writable state (indicated by "W" in FIG. 16) in the ordinary mode (AE). In this case, a contact a of a switch 15 which is located on the A/D converter 12 side is selected, and a video picture is displayed on the LCD 17.

When the high speed AF mode is set upon the first release operation, the write operation is inhibited, and the immediately preceding image data is held in the memory 14, and the switch 15 is switched from the contact a on the A/D converter 12 side to a contact b on the memory 14 side under the control of a CPU 20. As a result, the memory 14 is set in a readable state (indicated by "R" in FIG. 16) in which the image data stored in the memory 14 is repeatedly read out. The image data obtained immediately before the write operation is inhibited is repeatedly displayed (i.e., displayed as a still image) on the LCD 17.

The operation of the eighth embodiment will be described next with reference to the flow chart of FIG. 15. After a timing state in the ordinary mode is set by the timing generator setting processing in step S41, the switching processing is performed in step S42. More specifically, the CPU 20 performs switching control to turn on the A/D side (i.e., the contact a) of the switch 15. In this case, the image data having undergone A/D conversion is written in the memory 14 and is output to the LCD 17 through the contact a of the switch 15. As a result, a video picture is displayed on the LCD 17.

In step S43, the AE processing is performed. The CPU 20 then checks in step S44 whether the first release operation is performed, and waits for the execution of the first release operation. If YES in step S44, the CPU 20 checks in step S45 whether the high speed auto-focusing is performed. For example, as in the first embodiment, the CPU 20 checks, on the basis of the brightness of the subject, whether the auto-focusing is performed in the high speed AF mode.

When the auto-focusing is to be performed in the high speed AF mode, the timing generator setting for high speed AF is performed in step S46*a*. In step S46*b*, the switching processing is performed, and the memory 14 is set in the write protection state.

More specifically, the CPU 20 switches the switch 15 to the memory side (i.e., on the side where the contact b is turned on), and sets the memory 14 in the write protection state through a memory controller 13, thereby holding 1-frame image data imaged in the immediately preceding ordinary mode.

In this state, the memory 14 is in the readable state, and the stored image data is read out from the memory 14 and input to a D/A converter 6 through the contact b of the switch 15. As a result, the image data is converted into an analog video signal, and a still image is displayed on the LCD 17.

The auto-focusing is performed by the high speed AF processing in step S46*c*. Thereafter, the timing generator setting is performed in step S46*d* to restore the timing of the processing to the ordinary timing. In step S46*e*, the switch is switched to the A/D side. The flow then advances to step S47.

If it is determined in step S45 that the auto-focusing is not to be performed in the high speed AF mode, the auto-focusing is performed in the ordinary AF mode in step S46*f*. It is then checked in step S47 whether the first release operation is canceled.

When the first release operation is canceled, the flow returns to The AF processing in step S43. In contrast to this, if the first release operation is not canceled, it is checked in step S48 whether the second release operation is performed.

If NO in step S48, the flow returns to step S47. If YES in step S48, rhw timing generator setting for actual exposure operation is performed in step S49. After the image pickup operation is performed in step S50, the flow returns to step S41 to prepare the next image pickup operation.

According to this embodiment, an image obtained immediately before a shift to the high speed AF mode can be displayed even during the high speed AF mode. This can prevent disturbances on the screen of the LCD 17, and can also prevent the user from erroneously recognizing that the display function of the LCD 17 has failed. Other functions and effects are the same as those of the first embodiment.

Figure 17:
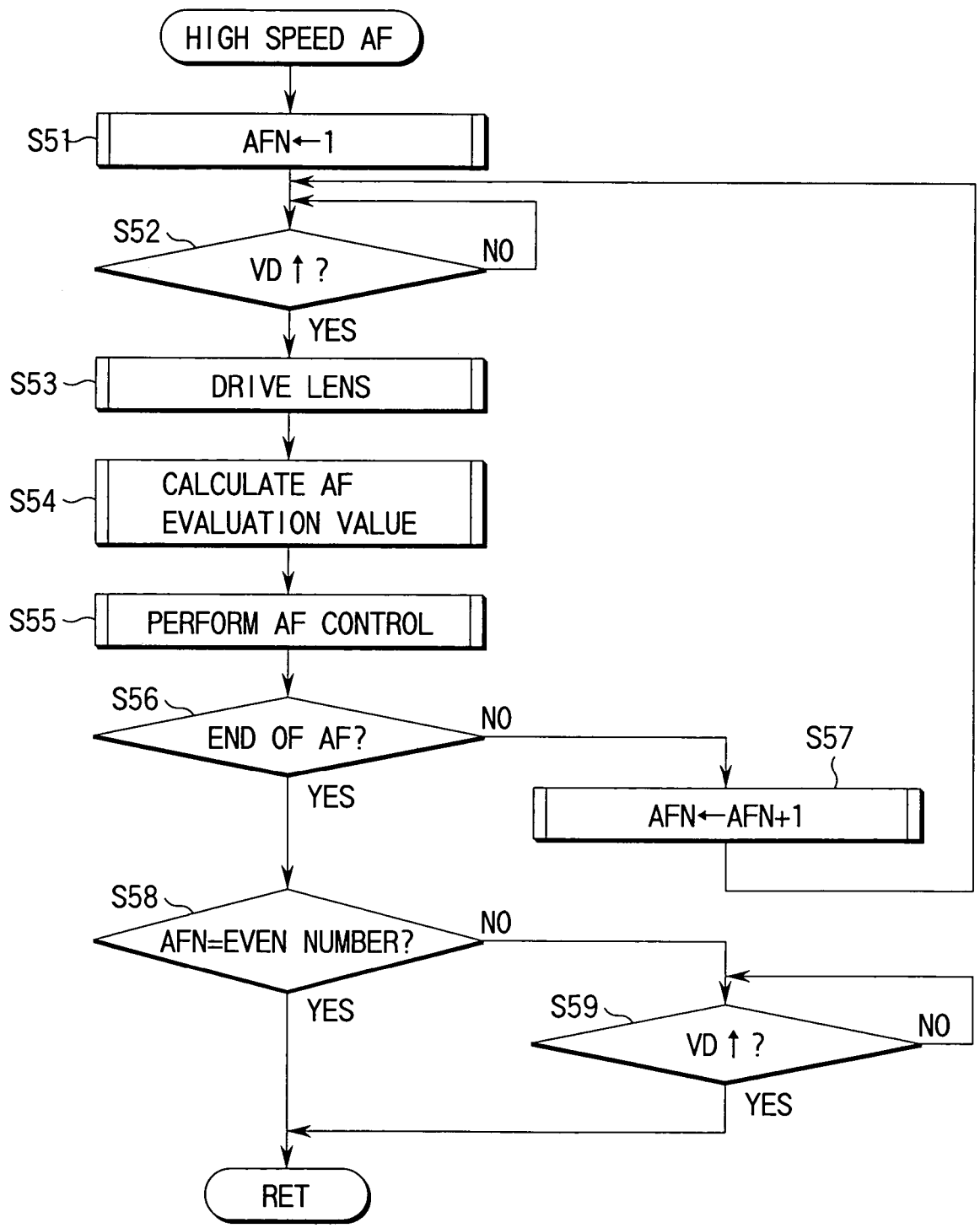
FIG. 17 is a flow chart showing the contents of the operation of an auto-focusing apparatus according to the ninth embodiment of the present invention.

The ninth embodiment of the present invention will be described next with reference to FIG. 17. This embodiment is designed to allow smooth processing after switching from the high speed AF mode to the ordinary mode. For example, the arrangement of this embodiment is the same as that shown in FIG. 1, and the high speed AF processing in step S5b in the flow chart of FIG. 5 is performed in the manner shown in FIG. 17.

More specifically, in this embodiment, for example, the frame rate in the high speed AF mode is twice the ordinary frame rate. If, therefore, the high speed AF mode is switched to the ordinary mode at an odd-numbered high speed frame rate upon completion of the auto-focusing in the high speed AF mode, a timing offset occurs in the ordinary mode. For this reason, the high speed AF mode is always switched to the ordinary mode after an even-numbered high speed frame rate is set. This allows a smooth control operation in each section at the timing in the ordinary mode.

This operation will be described next with reference to FIG. 17. When the processing in the high speed AF mode is started, initialization is performed by setting "1" to a variable AFN corresponding to the number of frames in the high speed AF mode in step S51. It is then checked in step S52 whether a signal VD has risen.

More specifically, a CPU 20 checks whether the leading edge of the signal VD output from a TG circuit 26 and synchronized with high speed frames in the high speed AF mode is detected, and waits for the leading edge of the signal. Upon detection of the leading edge of the signal VD, the CPU 20 performs lens driving processing in step S53. That is, the CPU 20 performs a lens driving processing to move a focusing lens 3 by a predetermined feed amount in the optical axis direction.

With this lens driving, an AF evaluation value in step S54 is obtained at the lens position where the lens is moved. In step S55, AF control processing is performed. More specifically, the CPU 20 calculates an AF evaluation value by using the AF processor circuit 25 at each lens position as the lens is moved, and discriminates the magnitudes of the AF evaluation values. The CPU 20 performs control to drive the lens in the lens driving direction in which the obtained AF evaluation values increase. In addition, when the AF evaluation value decreases after exceeding the maximum value, the CPU 20 performs AF control to set the lens at the in-focus position corresponding to the maximum value.

It is checked in step S56 whether AF (setting the lens at the position corresponding to the maximum value when the AF evaluation value decreases after exceeding the maximum value) is finished. If NO in step S56, the variable AFN is incremented by one in step S57. The flow then returns to step S52.

Similarly, the processing in steps S53 to S55 is repeated, and it is checked in step S56 whether AF is finished. If YES in step S56, the CPU 20 checks in step S58 whether the variable AFN is an even number. If NO in step S58, the CPU 20 waits for the leading edge of the signal VD in step S59, and finishes this high speed AF processing upon detection of the leading edge. In addition, if YES in step S58, the CPU 20 immediately finishes this high speed AF processing, and returns to the ordinary mode.

According to this embodiment, since the interval of the high speed AF mode is an even-numbered high speed frame interval, various operation timings can be smoothly set when the ordinary mode is restored.

In this embodiment, the frame rate in the high speed AF mode is twice that in the ordinary AF mode. However, the present invention can be applied to other cases. If, for example, the frame rate in the high speed AF mode is m times that in the ordinary AF mode, the high speed AF mode may be switched to the ordinary mode such that the high speed frame interval of the high speed AF mode is set to an integer multiple of m.

For example, in the flow chart of FIG. 5 in the first embodiment, in the AE processing in step S2, the AE processor circuit 23 calculates an AE evaluation value, and the CPU 20 determines an f-number on the basis of the calculated value. However, the f-number may be kept constant (e.g., the maximum aperture value in a full-aperture state) until timing generator setting for actual exposure in step S8 or image pickup operation in step S9. Note that embodiments obtained by partly combining the above embodiments are also incorporated in the present invention.

As has been described above, the present invention includes the image pickup unit that operates in both the mode in which data is read from the entire frame of the imager and operation is performed at the ordinary frame rate and the mode in which data is read from only the central portion of the frame of the imager and operation is performed at the high speed frame rate. The image pickup unit can operate at the high speed frame rate in the auto-focusing operation. Therefore, the auto-focusing can be performed at a high speed as well as at the ordinary frame rate.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An auto focusing apparatus comprising:
an image pickup section which has an imaging plane on which a subject image is formed, and generates an image signal;
a focusing section for selectively executing: (i) an ordinary mode of reading an image signal from an entirety of the imaging plane of said image pickup section and performing focusing at an ordinary frame rate, and (ii) a high speed mode of reading an image signal from a predetermined portion of the imaging plane of said image pickup section and performing focusing at a high speed frame rate;
an operation section for instructing a release operation; and
a control section for preferentially selecting the high speed mode depending on an image signal from the predetermined portion of the imaging plane, first after a start of the release operation, and for selecting the ordinary mode depending on an image signal from the entirety of the imaging plane, when the control section determines to fail to allow the focusing in the high speed mode.

2. An apparatus according to claim 1, wherein said focusing section determines brightness of a subject on the basis of the image signal, and selects the high speed mode and the ordinary mode in accordance with a first brightness and a second brightness lower than the first brightness, respectively.

3. An apparatus according to claim 1, wherein said focusing section detects a battery remaining quantity, and selects the high speed mode and the ordinary mode in accordance with a first magnitude of the remaining quantity and a second magnitude lower than the first magnitude, respectively.

4. An apparatus according to claim 1, wherein said image pickup section includes a focusing lens for focusing a subject image on the imaging plane, drives the focusing lens at an ordinary frame rate in the ordinary mode, and drives the focusing lens at a high speed frame rate in the high speed mode.

5. An apparatus according to claim 4, wherein said focusing section drives the focusing lens at 1/30 sec intervals in the ordinary mode, and drives the focusing lens at 1/60 sec intervals in the high speed mode.

6. An apparatus according to claim 4, wherein said focusing section calculates an evaluation value in an in focus state on the basis of the image signal from the entirety of the imaging plane, and sets the focusing lens at a position corresponding to a peak of a plurality of evaluation values obtained with movement of the focusing lens in the ordinary mode.

7. An apparatus according to claim 4, wherein said focusing section calculates an evaluation value in an in focus state on the basis of an image signal from a central portion of the imaging plane, and sets the focusing lens at a position corresponding to a peak of a plurality of evaluation values obtained with movement of the focusing lens in the high speed mode.

8. An apparatus according to claim 7, wherein said focusing section includes a gate circuit for receiving an image signal from the predetermined portion and discarding an image signal from a portion other than the predetermined portion at a high rate in the high speed mode, and means for evaluating an in focus state on the basis of the image signal from the predetermined portion.

9. An apparatus according to claim 1, wherein said focusing section sets a small display area of an auto focusing area of a finder in the high speed mode, and sets a large display area of the auto focusing area of the finder in the ordinary mode.

10. An apparatus according to claim 1, wherein said image pickup section includes a focusing lens for focusing a subject image on the imaging plane, and said focusing section decreases a feed amount of the focusing lens per frame interval in the high speed mode, and increases a feed amount of the focusing lens per frame interval in the ordinary mode.

11. An apparatus according to claim 1, wherein said image pickup section includes a focusing lens for focusing a subject image on the imaging plane, and said focusing section sets a feed amount of the focusing lens per unit time in the high speed mode to be larger than that in the ordinary mode.

12. An apparatus according to claim 1, wherein said focusing section includes an evaluation value memory for storing an autofocus evaluation value, and means for accessing said evaluation value memory from address 0 regardless of whether said focusing section is driven in the ordinary mode or the high speed mode.

13. An apparatus according to claim 1, wherein said focusing section includes a display unit for displaying a picture, and means for always displaying an image obtained immediately before setting of the high speed mode on said display unit in the high speed mode, and displaying a motion picture on said display unit in the ordinary mode.

14. An apparatus according to claim 1, wherein said focusing section sets a number of frames driven at a high speed frame rate to an even number when the high speed mode is switched to the ordinary mode.

15. An apparatus according to claim 1, wherein the control section includes a processor which determines to fail to allow the focusing in the high speed mode by checking whether a peak value of an auto-focusing evaluation value is indefinite due to an error.

16. An apparatus according to claim 1, wherein the control section determines whether the release operation is canceled when the focusing is determined, and executes the focusing when the release operation is cancelled.

17. An apparatus according to claim 1, wherein the control section determines whether the release operation is canceled when the focusing is determined, and determines whether to perform another release operation when the release operation is not cancelled.

* * * * *